(12) United States Patent
Lee et al.

(10) Patent No.: US 12,302,163 B2
(45) Date of Patent: May 13, 2025

(54) METHOD AND DEVICE FOR CONTROLLING DATA RATE IN WIRELESS COMMUNICATION SYSTEM

(71) Applicant: Samsung Electronics Co., Ltd., Suwon-si (KR)

(72) Inventors: Hoyeon Lee, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 416 days.

(21) Appl. No.: 17/636,507

(22) PCT Filed: Sep. 18, 2020

(86) PCT No.: PCT/KR2020/012635
§ 371 (c)(1),
(2) Date: Feb. 18, 2022

(87) PCT Pub. No.: WO2021/054770
PCT Pub. Date: Mar. 25, 2021

(65) Prior Publication Data
US 2022/0286895 A1 Sep. 8, 2022

(30) Foreign Application Priority Data

Sep. 20, 2019 (KR) .................. 10-2019-0116403
Nov. 8, 2019 (KR) .................. 10-2019-0142912
(Continued)

(51) Int. Cl.
*H04W 28/02* (2009.01)
*H04W 8/20* (2009.01)
(Continued)

(52) U.S. Cl.
CPC ......... *H04W 28/0257* (2013.01); *H04W 8/20* (2013.01); *H04W 76/10* (2018.02); *H04W 80/10* (2013.01)

(58) Field of Classification Search
CPC ......... H04W 28/0252; H04W 28/0257; H04W 76/00; H04W 76/10; H04W 76/11;
(Continued)

(56) References Cited

U.S. PATENT DOCUMENTS 10,595,268 B2  3/2020  Lee et al.
10,638,415 B2  4/2020  Baek et al.
(Continued)

FOREIGN PATENT DOCUMENTS

CN  108632887  * 10/2018  ............ H04W 28/02
CN  110035423 A  7/2019
(Continued)

OTHER PUBLICATIONS

3GPP; 3rd Generation Partnership Project; Technical Specification Group Services and System Aspects; Procedures for the 5G System; Stage 2 (Release 16); 3GPP TS 23.502; V16.1.1; Jun. 2019; Valbonne, France.
(Continued)

*Primary Examiner* — Warner Wong
(74) *Attorney, Agent, or Firm* — Jefferson IP Law, LLP

(57) ABSTRACT

Disclosed are a method and device for controlling the rate of data transmitted/received by a terminal in a wireless communication system. A method according to an embodiment of the present disclosure is a data rate control method of a terminal in an access and mobility management function (AMF) device of a wireless communication system, wherein the method may include the operations of: receiving, from the terminal, a registration request message, including an identifier of the terminal, transmitting the registration
(Continued)

request message including the identifier of the terminal to a unified data management (UDM), receiving subscription information, including network slice information which can be allocated to the terminal, from the UDM, querying a policy control function (PCF) device about policy association of the terminal including the network slice information, receiving a policy association response message, including information about restricting the total transmission rate of serving network slices, from the PCF, and providing the information about restricting the total transmission rate of the serving network slices to a base station of the terminal.

15 Claims, 14 Drawing Sheets

(30) Foreign Application Priority Data

Jan. 3, 2020 (KR) ........................ 10-2020-0000989
Mar. 24, 2020 (KR) ........................ 10-2020-0035939

(51) Int. Cl.
*H04W 76/10* (2018.01)
*H04W 80/10* (2009.01)

(58) Field of Classification Search
CPC ......... H04W 8/18; H04W 8/183; H04W 8/20;
H04W 8/205; H04W 80/00; H04W 80/08;
H04W 80/10; H04W 28/22; H04W 60/00;
H04W 8/00; H04W 67/74
See application file for complete search history.

(56) References Cited

U.S. PATENT DOCUMENTS

| | | | | |
|---|---|---|---|---|
| 2018/0262924 A1* | 9/2018 | Dao | ................... | H04W 72/535 |
| 2019/0007500 A1 | 1/2019 | Kim et al. | | |
| 2020/0374742 A1* | 11/2020 | Chong | ................ | H04W 72/542 |
| 2021/0037455 A1* | 2/2021 | Zhu | ........................ | H04W 76/27 |
| 2021/0368383 A1* | 11/2021 | Jangid | ............... | H04W 28/0289 |
| 2022/0022089 A1* | 1/2022 | Zhu | ...................... | H04W 56/001 |
| 2022/0256395 A1* | 8/2022 | Sun | ........................ | H04W 48/12 |
| 2022/0286895 A1* | 9/2022 | Lee | ................... | H04W 28/0257 |
| 2022/0369155 A1* | 11/2022 | Hedman | ............... | H04W 28/18 |
| 2023/0180061 A1* | 6/2023 | Natarajan | ............. | H04W 28/20 370/235 |
| 2023/0189053 A1* | 6/2023 | Natarajan | ......... | H04W 28/0257 370/230 |
| 2023/0239938 A1* | 7/2023 | Hedman | ............... | H04W 8/205 370/329 |

FOREIGN PATENT DOCUMENTS

| | | |
|---|---|---|
| CN | 110049072 A | 7/2019 |
| KR | 10-2018-0081969 A | 7/2018 |
| KR | 10-2018-0120610 A | 11/2018 |
| KR | 10-2019-0004217 A | 1/2019 |

OTHER PUBLICATIONS

Huawei et al.; QoS Parameters; 3GPP TSG-RAN WG2 Meeting #98; R2-1704976; May 15-19, 2017; Hangzhou, China.
Nokia et al.; Remaining clarifications on Slice Assistance Information with TP; 3GPP TSG-RAN WG2 Meeting #101bis; R2-1805679; revision of R2-1803463; Apr. 16-20, 2018; Sanya, China.
Nec et al.; Update of existing subclause for network slice specific authentication and authorization; 3GPP TSG-CT WG1 Meeting #119; C1-194931; Aug. 26-30, 2019; Wroclaw (Poland).
European Office Action dated Jul. 31, 2024, issued in European Patent Application No. 20864401.3.
Chinese Office Action dated Dec. 28, 2024, issued in Chinese Patent Application No. 202080066102.7.

* cited by examiner

METHOD AND DEVICE FOR CONTROLLING DATA RATE IN WIRELESS COMMUNICATION SYSTEM

CROSS-REFERENCE TO RELATED APPLICATION(S)

This application is a U.S. National Stage application under 35 U.S.C. § 371 of an International application number PCT/KR2020/012635, filed on Sep. 18, 2020, which is based on and claims priority of a Korean patent application number 10-2019-0116403, filed on Sep. 20, 2019, in the Korean Intellectual Property Office, of a Korean patent application number 10-2019-0142912, filed on Nov. 8, 2019, in the Korean Intellectual Property Office, of a Korean patent application number 10-2020-0000989, filed on Jan. 3, 2020, in the Korean Intellectual Property Office, and of a Korean patent application number 10-2020-0035939, filed on Mar. 24, 2020, in the Korean Intellectual Property Office, the disclosure of each of which is incorporated by reference herein in its entirety.

TECHNICAL FIELD

The disclosure relates to a method and an apparatus for controlling a rate of data transmitted/received by a terminal in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system.

The 5G communication system is considered to be implemented in ultra-higher frequency (mmWave) bands (e.g., 60 GHz bands) so as to accomplish higher data rates. To decrease propagation loss of the radio waves and increase the transmission distance in the ultra-higher frequency bands, beamforming, massive multiple-input multiple-output (MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

With the development of various information technologies (ITs), network equipment has evolved to a virtualized network function (NF) through the application of a virtualization technology, and virtualized NFs may be implemented in the form of software beyond physical restriction and installed/operated in various types of clouds or data centers (DCs). Particularly, the NF may be freely expanded, scaled, installed (initiated), or terminated according to service requirements, system capacities, or network load. Since the NFs should be basically executed on a physical configuration, for example, predetermined equipment, even though the NFs are implemented in the form of software, it should be noted that the physical configuration is not excluded. Further, the NFs may be implemented simply by a physical configuration, that is, only hardware.

In order to support various services in various network structures, a network slicing technology has been introduced. Network slicing is a technology for logically configuring the network by a set of network functions (NFs) for supporting a specific service and separating the same from other slices. One terminal may access two or more difference slices. In this case, different network slices corresponding to difference services may be accessed or even the same service may be provided through different network slices.

As described above, due to the development of mobile communication systems, various services or one service can be provided through different network slices, and thus a scheme for effectively controlling a communication rate for each network slice for the terminal is needed.

DISCLOSURE OF INVENTION

Technical Problem

The disclosure provides a method and an apparatus for effectively controlling a data rate provided to a terminal, for example, a user equipment in a wireless communication system.

Solution to Problem

A method of controlling a data rate of a UE by a session management function (SMF) device in a wireless communication system according to an embodiment of the disclosure may include: receiving a protocol data unit (PDU) session create request message including network slice information of the UE and UE information from an access and mobility management function (AMF), generating session management (SM) context for managing the PDU session for the UE, acquiring UE subscription information of the UE from a unified data management (UDM) device, establishing SM policy association with a policy control function (PCF) device, determining an aggregate maximum bit rate (AMBR) of single network slice selection assistance information (S-NSSAI) of the PDU session for the UE, based on the SM policy association, establishing an N4 session with the AMF, based on the SM policy association and the S-NSSAI-AMBR, and informing the AMF device of the session establishment with the UPF.

A session management function (SMF) device in a wireless communication network according to an embodiment of the disclosure may include: a network interface configured to communicate with another network entity in the wireless communication network, a memory configured to store information received from the another network entity, and at least one processor, wherein the processor may be configured to receive a protocol data unit (PDU) session create request message including network slice information for the UE and UE information from an access and mobility function (AMF) device through the network interface, generate session management (SM) context for managing the PDU session for the UE, acquire UE subscription information of the UE from a unified data management (UDM) device through the network interface, establish SM policy association with a policy control function (PCF) device through the network interface, determine an aggregate maximum bit rate (AMBR) of single network slice selection assistance information (S-NSSAI) of the PDU Session for the UE, based on the SM policy association, establish an N4 session with the AMB, based on the SM policy association and the S-NSSAI-AMBR, and inform the AMF device of the session establishment with the UPF.

Advantageous Effects of Invention

Through a method and an apparatus according to the disclosure, it is possible to effectively control a data rate provided to a terminal, for example, a user equipment in a wireless communication system. Further, when embodiments of the disclosure are applied, a mobile communication system can efficiently manage network resources by configuring network slices to provide data in accordance with a data rate required for the user equipment or the network. In addition, the mobile communication system can change the data rate of the network slice to which the UE subscribes according to various situations.

MODE FOR THE INVENTION

Figure 1:
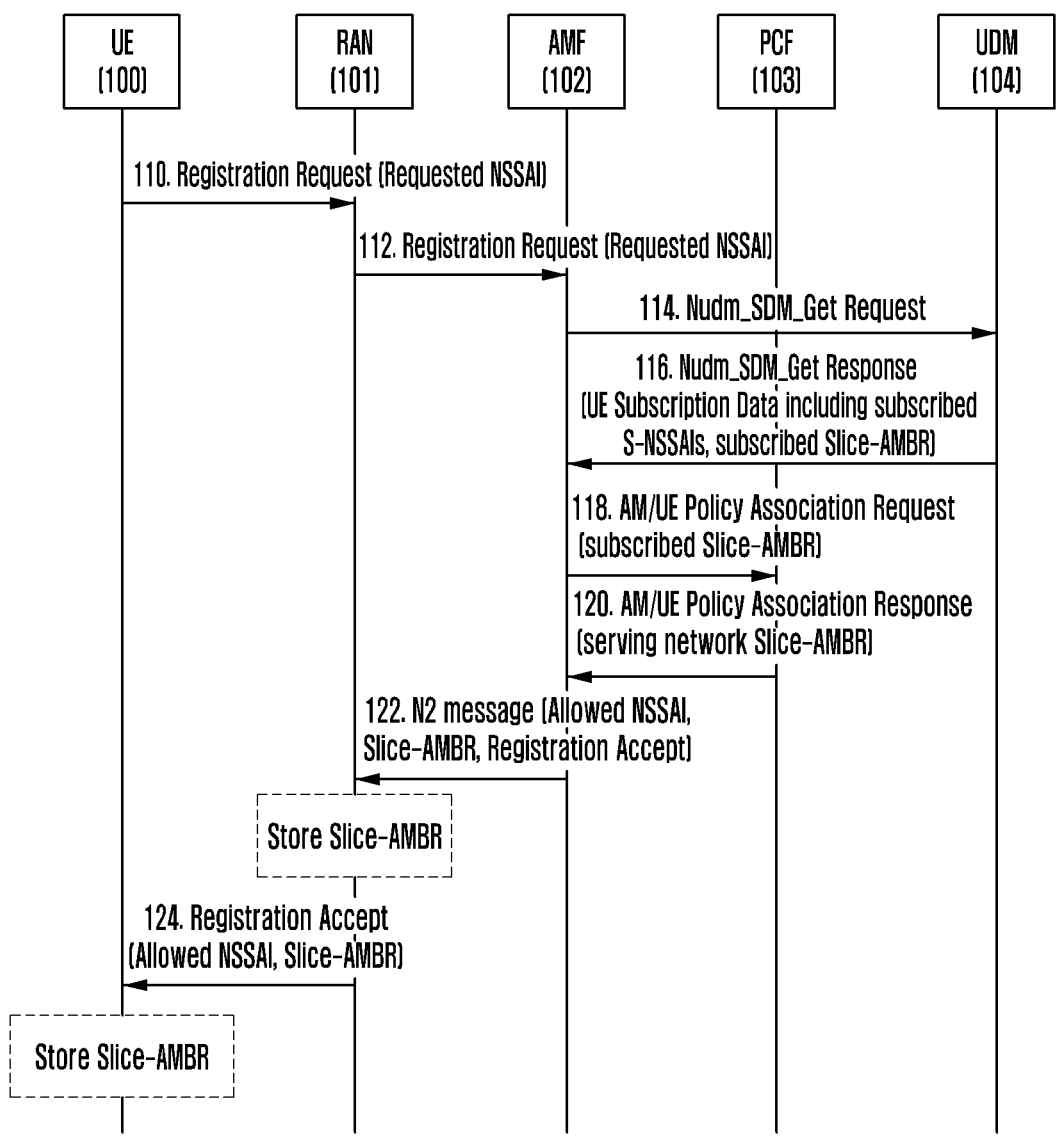
FIG. 1 illustrates a registration procedure according to an embodiment of the disclosure.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

The disclosure relates to a method and an apparatus for supporting various services in a wireless communication system. Specifically, the disclosure describes a technology for supporting various services by supporting mobility of a terminal in a wireless communication system.

As used in the following description, terms referring to signals, terms for identifying access nodes, terms referring to network entities or network functions (NFs), terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

NFs used in the disclosure may be one network entity or a portion of one network entity. The network entity may have both a physical configuration and a software configuration and may be implemented as one equipment, one device, or one computing system. In another example, one NF may be implemented as one NF through two or more pieces of equipment, two or more devices, or two or more computing systems. Further, one NF may be installed in one computing system or two or more computing systems as a specific software module to operate as one NF.

In the following description, for convenience of description, unless specially mentioned, NFs may be understood as having the form including one network entity or a physical device implemented as one network entity and a software configuration.

For convenience of description, the disclosure uses terms and names defined in a 3rd-generation partnership project long-term evolution (3GPP LTE) and 5G standards. However, the disclosure is not limited by the terms and names, and may be equally applied to a system that is based on another standard.

A 5G system according to an embodiment of the disclosure may include a terminal, a base station, and a 5G core network. The 5G core network may include network functions (hereinafter, interchangeably used with NFs) such as an AMF, an SMF, a PCF, a UPF, a UDM, a UDR, an NEF, an NSSF, and the like. According to an embodiment of the disclosure, the network function (NF) may mean a network entity (hereinafter, interchangeably used with an NE) or network resources. A next generation radio access network (NG-RAN) (hereinafter, interchangeably used with a 5G-RAN or an RAN) is a base station providing a wireless communication function to a terminal. The terminal (user equipment or UE) may access the 5G core network through the base station.

Further, various network functions described below may include one specific physical device or two or more physical devices. In addition, each physical device may include a program (software) for performing methods described below according to the control of a processor included therein. Hereinafter, only names of the NFs are presented for convenience of description, but the NFs are implemented as physical devices including at least one processor as described above and it is apparent to those skilled in the art that the NFs can have (install) programs (software) for operations described in the disclosure. Accordingly, the expression "device" is omitted and only a name of a specific NF is described hereinafter.

According to an embodiment of the disclosure, an access and mobility management function (AMF) is a network function of managing wireless network access and mobility for the terminal. A session management function (SMF) is a network function of managing a packet data network connection provided to the terminal, for example, a user equipment (UE). In the following description, the terminal and the UE may mean all devices capable of accessing a specific wireless network through a radio access scheme in the same way. The packet data network connection is referred to as a protocol data unit (PDU) session. PDU session information may include quality of service (QoS) information, charging information, or information on packet processing. A policy control function (PCF) is a network function of applying a service policy of a mobile communication service provider for the terminal, a charging policy, and a policy for a PDU session. A user plane function (UPF) serves as a gateway for delivering a packet transmitted and received by the terminal and is a network function controlled by the SMF. The UPF is connected to a data network (DN) and serves to transmit an uplink data packet generated by the terminal to an external data network through a 5G system. Further, the UPF serves to transmit a received downlink data packet generated by an external data network to the terminal through the 5G system. For example, the UPF may be connected to the data network connected through the Internet and may route a data packet transmitted from the terminal through the Internet and route a data packet transmitted from the Internet to the terminal.

A unified data management (UDM) is a network function of storing and managing information on a subscriber. A network exposure function (NEF) is a network function capable of accessing information for managing the terminal in the 5G network so as to subscribe to a mobility management event of the terminal, subscribe to a session management event of the terminal, make a request for session-related information, configure charging information of the terminal, and make a request for changing a PDU session policy for the terminal, that is, transmitting information on the terminal to NFs through the connection to 5G core network NFs or reporting information on the terminal to the outside. An application function (AF) is a network function capable of using a service and a function provided by the 5G network through the NEF.

A unified data repository (UDR) is a network function of storing and managing data. For example, the UDR may store terminal subscription information and provide the terminal subscription information to the UDM when a new terminal is subscribed or the existing terminal subscription information is changed or the change is requested. The UDR may store service provider policy information and provide the service provider policy information to the PCF. The UDR may store network service exposure-related information and provide the network service exposure-related information to the NEF. A network slice selection function (NSSF) is a network function of determining a network slice available by the terminal and determining network slice instances included in the network slice.

One network slice or one network slice instance may be operated as a program in one equipment, one device, and/or one computing system. In another example, one network slice or one network slice instance may be operated as a program in two or more pieces of equipment, two or more devices, and/or two or more computing systems. In another example, one specific network slice or one specific network slice instance may be operated as a program in one equipment, one device, and/or one computing system and another network slice or another network slice instance may be operated as a program in two or more pieces of equipment, two or more devices, and/or two or more computing systems.

Each NF may predefine a service provided by itself, and services provided by the NFs may be referred to as Nfcf, Nsmf, Namf, and Nnef services. For example, when the AMF transmits a session-related message to the SMF, the AMF may use a Nsmf_PDUSession_CreateSMContext service (or an application program interface (API)).

In the following description, one service, for example, Npcf service may collectively refer to messages exchanged with the PCF through an interface for communication with the PCF. In the above example, when the AMF uses the Nsmf_PDUSession_CreateSMContext service to transmit session-related message to the SMF, the messages may be specific messages configured according to a format required by the SMF through an interface for communication with the SMF.

The terminal may access the AMF through the base station and exchange a control plane signaling message with the 5G core network. Further, the terminal may access the UPF through the base station and exchange user plane data with the data network. An application server providing an application layer service to the terminal may be referred to as the AF when the control plane signaling message is exchanged with the 5G core network and may be referred to as the DN when the user plane data is exchanged with the terminal. Accordingly, both the AF and the DN may be used as the name of the application server.

Meanwhile, the mobile communication system may include a network supporting network slicing. That is, one physical network may be configured and managed as logically separated network slices (hereinafter, interchangeable used with slices). The mobile service provider may provide dedicated network slices specialized for various services having different characteristics. Respective network slices may have different types and different amounts of required resources according to service characteristics, and the mobile communication system may guarantee resources required by each network slice. For example, a network slice providing a voice call service may have frequent control plane signaling occurrences and thus include NFs specialized therefor. A network slice providing an Internet data service may have frequent large data traffic occurrences and thus include NFs specialized therefor. In the 5G system defined by the 3GPP, one network slice may be referred to as "S-NSSAI". Single network slice selection assistance information (S-NSSAI) may include a slice/service type (SST) value and a slice differentiator (SD) value. The SST may indicate a characteristic of a service supported by the slice (for example, enhanced mobile broadband (eMBB), Internet of things (IoT), ultra-reliable low latency communications (URLLC), and vehicle-to-everything (V2X)). The SD may be used as an additional delimiter for a specific service referred to as the SST.

The terminal may access a mobile communication system to perform a registration procedure. In the registration procedure, the terminal may transmit network slice information to be used to the mobile communication system. The network slice information which the terminal transmits to the mobile communication system may be referred to as a "requested slice (requested NSSAI)", and the requested NSSAI may include one or more S-NSSAI values. The mobile communication system may authenticate the terminal request and, when the authentication is successful, may determine network slice information available by the terminal. The network slice information determined by the mobile communication system may be referred to as an "allowed slice (allowed NSSAI)", and the allowed NSSAI may include one or more S-NSSAI values. The terminal may receive the allowed NSSAI from the mobile communication system. The terminal may store the allowed NSSAI and use the same for the following procedure.

The terminal completing the registration procedure may be connected to the DN to perform a PDU session establishment procedure in order to transmit and receive data. The terminal may insert S-NSSAI and/or data network name (DNN) information to be used into the PDU session establishment request message and transmit the message to the mobile communication system. The mobile communication system may authenticate the terminal request and, when the authentication is successful, may establish a PDU session for the terminal. Through such a process, the terminal may establish one or more PDU sessions in one network slice. When different PDU sessions are supported for one terminal in one network slice, DNNs may be the same or different. For example, the terminal may establish three different PDU sessions using the eMBB slice (eMBB S-NSSAI). The first PDU session may support the eMBB S-NSSI and DNN1. The second PDU session may support the eMBB S-NSSI and DNN2. The third PDU session may support the eMBB S-NSSI and DNN2. The first PDU session and the second PDU session may correspond to the case in which different DNNs are supported in the same network slice (S-NSSAI), and the second PDU session and the third PDU session may correspond to the case in which the same DNN is supported in the same network slice.

The disclosure describes a method and an apparatus for controlling a data rate of a network slice for each terminal in a mobile communication system. To this end, the disclosure describes the operation of nodes included in the 5G system, for example, the terminal, the base station, the AMF, the SMF, and the UPF for controlling the data rate of the network slice for each terminal. Particularly, when one S-NSSAI supports two or more PDU sessions for one terminal, a method and an apparatus for controlling uplink data traffic and downlink data traffic of each PDU session are described.

When embodiments of the disclosure are applied, the mobile communication system may configure network slices to provide a required data rate and efficiently manage network resources. Further, the mobile communication system may change the data rate of the network slice to which the terminal subscribes according to various situations.

According to various embodiments of the disclosure, when describing nodes included in the 5G system, numbers may be assigned. For example, when numbers such as SMF1 and SMF2 are assigned, the numbers may mean that the SMFs are logically and/or physically separated but operations performed thereby may be the same. Assigning numbers may mean that a plurality of sessions are processed by logically and/or physically different NFs.

Hereinafter, the NF may be at least one of the access and mobile management function (AMF) device, the session management function (SMF) device, and the network slice selection function (NSSF) device. However, embodiments of the disclosure may be equally applied to the case in which the NF is actually implemented as instance (AMF Instance, SMF Instance, or NSSF Instance).

In the disclosure, an instance may mean a state in which a specific NF exists in the form of a software code and physical or/and logical resources may be allocated from a computing system to perform an NF function and executed by a physical computing system, for example, a specific computing system existing in a core network. Accordingly, an AMF instance, an SMF instance, or the NSSF instance may mean that physical or/and logical resources may be used for the AMF, SMF, or NSSF operation after being allocated from a specific computing system existing in a core network. As a result, the AMF instance, the SMF instance, and the NSSF instance receiving physical or/and logical resources for the AMF, SMF, and NSSF operation from a specific computing system existing in the network may perform the same operation as that in the case in which physical AMF, SMF, and NSSF devices exist. Accordingly, in embodiments of the disclosure, the description of the NF (AMF, SMF, UPF, NSSF, NRF, or SCP) may be replaced with an NF instance or inversely the description of the NF instance may be replaced with the NF. Similarly, in embodiments of the disclosure, the description of an NW slice may be replaced with an NW slice instance or inversely the description of the NW slice instance may be replaced with the NW slice.

Embodiment 1

Among various embodiments of the disclosure, Embodiment 1 describes a method of managing a data rate of a network slice for each terminal in a mobile communication system. More specifically, embodiment 1 describes a method by which data rate information of a network slice for each terminal is defined, the terminal, the base station, and the NF store the network slice data rate information for each terminal, and uplink data and downlink data traffic are controlled.

According to an embodiment of the disclosure, a total transmission rate limit QoS parameter associated with the network slice (aggregate rate limit QoS parameter associated with S-NSSAI) used by the terminal may be defined. As described above, the aggregate rate limit QoS parameter associated with the network slice may include, for example, an aggregate maximum bit rate per network slice (per S-NSSAI aggregate maximum bit rate, hereinafter referred to as slice-AMBR or S-NSSAI-AMBR, NSSAI-AMBR, SST-AMBR, S-AMBR, or slice-MBR). The slice-AMBR may be divided into a subscribed slice-AMBR, a serving network slice-AMBR, and an authorized slice-AMBR according to the NF storing and managing the slice-AMBR.

The subscribed slice-AMBR may be stored in the UDM as UE subscription information. The UDM may provide the subscribed slice-AMBR to the 5G core network NF (for example, AMF or SMF). The UDM may manage the subscribed slice-AMBR along with subscribed S-NSSAI of the terminal. For example, when there are eMBB S-NSSAI, URLLC S-NSSAI, and IoT S-NSSAI as the UE subscription slices, there may be a slice-AMBR linked to each piece of the S-NSSAI. That is, for example, there may be an eMBB slice-AMBR, a URLLC slice-AMBR, and an IoT Slice-AMBR. Further, there may be a default slice-AMBR which can be applied when there is no slice-AMBR linked to specific S-NSSAI. For example, when there is no IoT slice-AMBR, the default slice-AMBR may be used for IoT S-NSSAI.

The serving network slice-AMBR may be managed by the PCF. The PCF may determine the serving network slice-AMBR on the basis of S-NSSAI, mapping of S-NSSAIs (mapping information of subscribed S-NSSAI of the terminal and serving network S-NSSAI), a subscribed slice-AMBR, a session-AMBR, a mobile communication service provider policy, a local policy, and roaming agreement. For example, the PCF may determine the slice-AMBR of S-NSSAI mapped to the subscribed S-NSSAI which is the subscribed network slice of the terminal and used by the serving network, that is, the serving network slice-AMBR. The serving network slice-AMBR may be used to support a roaming subscriber. The PCF may provide the serving network slice-AMBR to 5G core network NFs, for example, the AMF and the SMF.

The authorized slice-AMBR may be managed by the PCF. The PCF may determine the authorized network slice-AMBR on the basis of S-NSSAI, mapping of S-NSSAIs (mapping information of subscribed S-NSSAI of the terminal and serving network S-NSSAI), a subscribed slice-AMBR, a serving network slice-AMBR, a session-AMBR, a mobile communication service provider policy, a local policy, and roaming agreement. The PCF may provide the authorized network slice-AMBR to 5G core network NFs, for example, the AMF and the SMF.

The 5G core network NFs, for example, the, AMF and the SMF may determine to use the subscribed slice-AMBR acquired from the UDM, change the subscribed slice-AMBR acquired from the UDM on the basis of the local policy and then use the changed subscribed slice-AMBR, or use the serving network slice-AMBR or/and the authorized slice-AMBR acquired from the PCF in order to manage the data rate of the network slice used by the terminal.

The slice-AMBR may indicate a limit of the aggregate bit rate expected to be provided on non-GBR QoS flows for all PDU sessions associated with the corresponding S-NSSAI. Further, the slice-AMBR may indicate a value measured in an AMBR averaging window. For example, when the terminal establishes three PDU sessions associated with eMBB S-NSSAI and the user plane of the three PDU sessions is in an activated state (PDU Sessions with active user plane to RAN), the slice-AMBR for the eMBB S-NSSAI may be calculated as a sum of AMBRs used by the three PDU sessions. At this time, the slice-AMBR may be configured as a value equal to or smaller than the subscribed slice-AMBR or/and the authorized slice-AMBR or/and the serving network slice-AMBR determined to be used by the 5G NF. For example, when the eMBB slice-AMBR determined to be used by the 5G NF is 1 Giga bit per second (Gbps) and AMBRs to be used by the three PDU sessions are 200 Mega bit per second (Mbps), 100 Mbps, and 150 Mbps, the final slice-AMBR for the eMBB S-NSSAI may be configured as 450 Mbps which is a sum of the AMBRs of the PDU sessions. According to another embodiment of the disclosure, when the eMBB slice-AMBR determined to be used by the 5G NF is 1 Gbps and the AMBRs to be used by the three PDU sessions are 500 Mbps, 300 Mbps, and 400 Mbps, the final slice-AMBR for the eMBB S-NSSAI may be configured as 1 Gbps. Accordingly, the 5G system may control the AMBR which can be used by each PDU session.

The terminal may use one or more pieces of S-NSSAI and may configure the sum of the slice-AMBRs for the S-NSSAI to be equal to or smaller than a UE-AMBR. For example, when the UE-AMBR of the terminal is 4 Gbps, the slice-AMBR for eMBB S-NSSAI used by the terminal is 1 Gbps, the slice-AMBR for URLLC S-NSSAI is 1 Gbps, and the slice-AMBR for CIoT S-NSSAI is 500 Mbps, the final UE-AMBR may be configured as 2.5 Gbps which is a sum of the slice-AMBRs. In general, CIoT is a communication method and may be IoT using a cellular network. For example, it may be a technology for providing an IoT service in a mobile communication system (cellular network).

In another example, when the UE-AMBR of the terminal is 4 Gbps, the slice-AMBR for eMBB S-NSSAI used by the terminal is 3 Gbps, the slice-AMBR for URLLC S-NSSAI is 1 Gbps, and the slice-AMBR for CIoT S-NSSAI is 500 Mbps, the final UE-AMBR may be configured as 4 Gbps. Accordingly, the 5G system may control the slice-AMBR associated with the S-NSSAI.

Through the above description, the operation of core network NFs and the terminal is described in more detail with reference to the accompanying drawings.

FIG. 1 illustrates a registration procedure according to an embodiment of the disclosure.

Prior to description with reference to FIG. 1, a UE 100 and network entities are described. The UE 100 is located within a specific RAN 101 and may configure a radio channel and communication with the RAN 101. The RAN 101 may be a base station of the 5G network, a base station of LTE or LTE-A, or a network entity serving as a base station in other wireless communication networks as described above. Hereinafter, for convenience of description, it is assumed that the RAN 101 is a 5G base station and a mobile communication system is a 5G wireless communication network. Further, it is assumed that a 5G core network expect for the RAN 101 includes an AMF 102, a PCF 103, and a UDM 104. Parts marked by dotted lines in FIG. 1 described below may be procedures which can be omitted when only signal flow is considered.

Meanwhile, the 5G system may determine a slice-AMBR of S-NSSAI which can be used by the UE 100 and provide the slice-AMBR to the UE 100, the RAN 101, and relevant 5G NFs during the registration procedure of the UE 100.

Referring to FIG. 1, in order to perform the registration procedure, the UE 100 may transmit a registration request message in operation 110. The registration request message may include a requested NSSAI which the UE desires to use such as a UE ID, for example, a subscription permanent identifier (SUPI), a 5G globally unique temporary identifier (5G-GUTI), or the like. For description of the disclosure, it is assumed that the requested NSSAI includes eMBB S-NSSAI and URLLC S-NSSAI.

In operation 112, the RAN 101 may select the AMF 102 to which the registration request message is transmitted on the basis of at least one of the received UE ID, the requested NSSAI, and a local policy. The RAN 101 may transfer the registration request message to the selected AMF 102.

In operation 114, the AMF 102 may transmit a Nudm_SDM_Get request message to make a request for subscription information of the UE 100 to the UDM 104. The Nudm_SDM_Get request message may include the UE ID, for example, an SUPI or the like.

In operation 116, the UDM 116 may transmit UE subscription information referring to the UE ID to the AMF 102 in response thereto. The UE subscription information may include subscribed S-NSSAIs to which the UE 100 subscribed and a subscribed slice-AMBR for each subscribed S-NSSAI. For example, when the UE subscription information includes eMBB S-NSSAI, URLLC S-NSSAI, and IoT S-NSSAI as a plurality of pieces of subscribed S-NSSAI, the subscribed slice-AMBR of the UE subscription information may include a subscribed slice-AMBR for eMBB S-NSSAI, a subscribed slice-AMBR for URLLC S-NSSAI, and a subscribed slice-AMBR for IoT S-NSSAI. For description of the disclosure, it is assumed that eMBB S-NSSAI, URLLC S-NSSAI, and IoT S-NSSAI are included as subscribed S-NSSAIs.

The AMF 102 receiving the UE subscription information from the UDM 104 in operation 116 may determine allowed NSSAI on the basis of at least one of the requested NSSAI received from the UE 100, the subscribed S-NSSAI received from the UDM 104, and the local policy before operation 118. According to another embodiment of the disclosure, the allowed NSSAI may be acquired from an NSSF (not shown in FIG. 1) by the AMF 102 as well as the method in FIG. 1. For example, the AMF 102 or/and the NSSF may identify that the eMBB-S-NSSAI and the URLLC S-NSSAI included in the requested NSSAI are included in the subscribed S-NSSAIs and determine to provide the eMBB S-NSAAI and the URLLC S-NSSAI to the allowed NSSAI. The AMF 102 may store the allowed NSSAI and the subscribed slice-AMBR through UE context of the UE 100.

In operation 118, the AMF 102 may establish access and mobility (AM) policy association or/and UE policy association with the PCF 103. A policy association request message which the AMF 102 transmits to the PCF 103 may include at least one of subscribed S-NSSAI, allowed NSSAI, mapping of S-NSSAIs, subscribed slice-AMBR, SUPI, and a home public land mobile network (HPLMN) ID. At this time, the subscribed slice-AMBR may include all subscribed Slice-AMBRs which the AMF 102 receives from the UDM 104. According to an embodiment of the disclosure, all subscribed slice-AMBRs which the AMF 102 receives from the UDM 104 may include a subscribed slice-AMBR for eMBB S-NSSAI, a subscribed slice-AMBR for URLLC S-NSSAI, and a subscribed slice-AMBR for IoT S-NSSAI. According to another embodiment of the disclosure, the subscribed slice-AMBR may include only the subscribed slice-AMBR for S-NSSAI included in the allowed NSSAI determined by the AMF 102 or/and the NSSF. In a detailed example thereof, the subscribed slice-AMBR may include only the subscribed Slice-AMBR for S-NSSAI included in the allowed NSSAI determined by the AMF 102 or/and the NSSF, the subscribed Slice-AMBR for eMBB S-NSSAI, and the subscribed Slice-AMBR for URLLC S-NSSAI.

In operation 120, the PCF 103 may determine a serving network slice-AMBR of each of the received subscribed slice-AMBRs. For example, the PCF 103 may determine an HPLMN of the UE on the basis of the received SUPI and HPLMN ID and determine the serving network slice-AMBR for S-NSSAI used by the serving network on the basis of subscribed S-NSSAI, mapping of S-NSSAIs (S-NSSAI mapped to subscribed S-NSSAI and used by the serving network), and roaming agreement with the HPLMN. The subscribed Slice-AMBR and the serving network slice-AMBR determined by the PCF 103 may be the same as or different from each other. The PCF 103 may transmit a policy association response message to the AMF 102 and establish policy association. The policy association response message may include the serving network slice-AMBR.

The AMF 102 receiving the serving network slice-AMBR from the PCF 103 may determine to use one of the subscribed slice-AMBR or/and the slice-AMBR modified by the AMF 102 based on the subscribed slice-AMBR or/and the serving network slice-AMBR received from the PCF 103 as the slice-AMBR to be used for each piece of S-NSSAI included in the allowed NSSAI of the UE 100. The AMF 102 may add the slice-AMBR to UE context of the UE 100.

In operation 122, the AMF 102 may transmit an N2 message to the RAN 101. The N2 message may include allowed NSSAI, a slice-AMBR to be used for each piece of S-NSSAI included in the allowed NSSAI, a UE-AMBR, and a registration accept message which the AMF 102 transmits to the UE 100. The registration accept message may include allowed NSSAI and the slice-AMBR for each piece of the S-NSSAI included in the allowed NSSAI.

The RAN 101 receiving the N2 message may store the allowed NSSAI for the UE 100, the slice-AMBR for each piece of the S-NSSAI included in the allowed NSSAI, and a UE-AMBR. The RAN 101 may use the stored slice AMBR and UE-AMBR in order to control an uplink and downlink data traffic rate of the UE thereafter. According to various embodiments of the disclosure, when the operation is described only through signal flow, the operation (operation stored in the RAN) may be omitted.

In operation 124, the RAN 101 may transmit the registration accept message to the UE 100. At this time, the registration accept message may also include allowed NSSAI and the slice-AMBR for each piece of the S-NSSAI included in the allowed NSSAI.

The UE 100 receiving the registration accept message may store the allowed NSSAI and the slice-AMBR for each piece of the S-NSSAI included in the allowed NSSAI. The UE 100 may use the stored slice-AMBR in order to control an uplink data traffic rate in the following procedure. According to various embodiments of the disclosure, when the operation is described only through signal flow, the operation (operation stored in the UE) may be omitted.

The UE 100, the RAN 101, and the AMF 102 according to various embodiments of the disclosure may acquire and store slice-AMBR information through the procedure illustrated in FIG. 1 described above. Further, the RAN 101 and the AMF 102 may provide a service to the UE 100 by using the slice-AMBR information acquired through the procedure illustrated in FIG. 1 described above.

Figure 2:
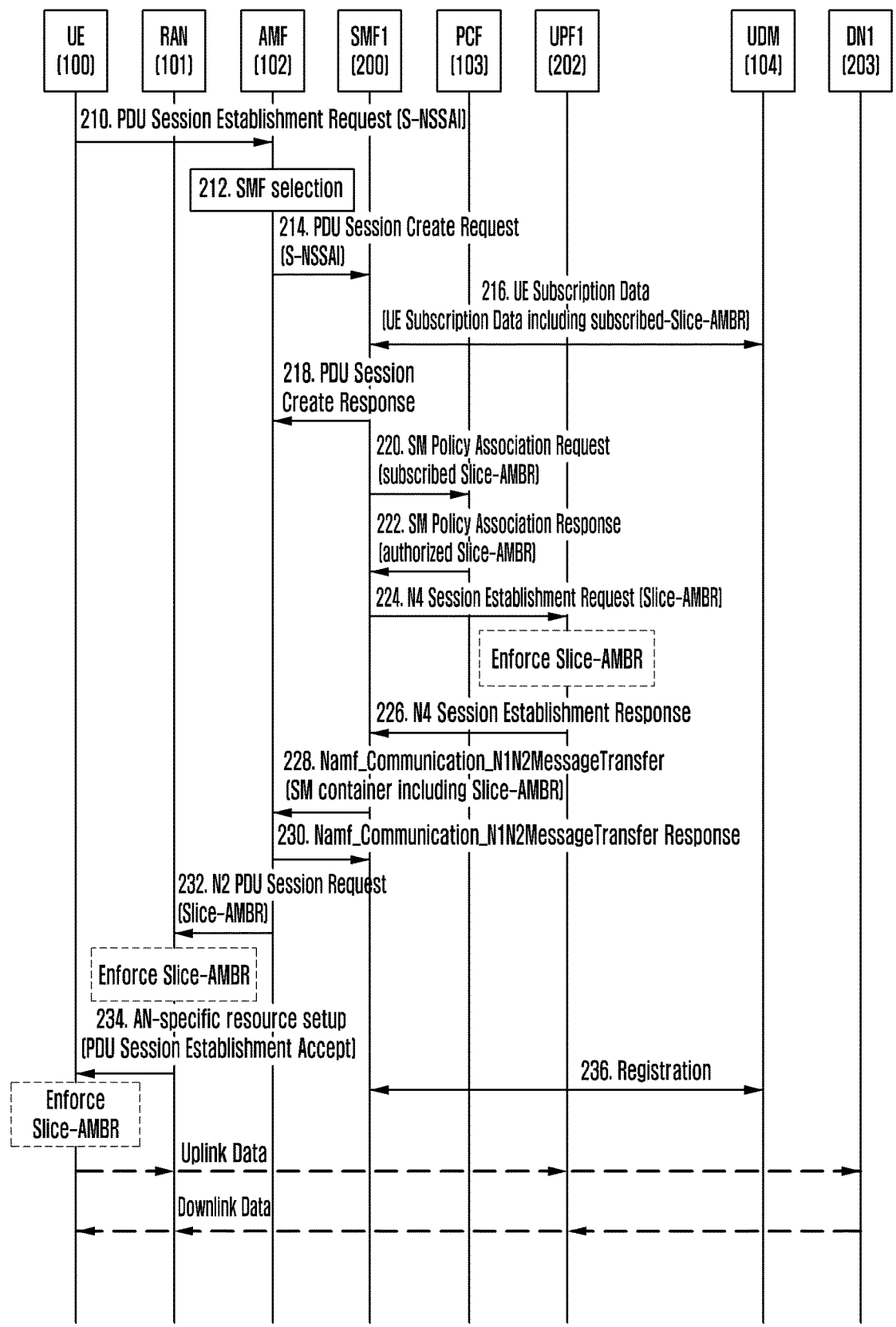
FIG. 2 illustrates a PDU session establishment procedure according to an embodiment of the disclosure.

FIG. 2 illustrates a PDU session establishment procedure according to an embodiment of the disclosure.

Prior to description with reference to FIG. 2, a UE 100 and network entities are described. The UE 100 is located within a specific RAN 101 and may configure a radio channel and communication with the RAN 101. The RAN 101 may be a base station of the 5G network, a base station of LTE or LTE-A, or a network entity serving as a base station in other wireless communication networks as described above. Hereinafter, for convenience of description, it is assumed that the RAN 101 is a 5G base station and a mobile communication system is a 5G wireless communication network. Further, it is assumed that a 5G core network expect for the RAN 101 includes the AMF 102, SMF1 200, the PCF 103, a UPF 202, the UDM 104, and a DN 203. The PCF 103 of FIG. 1 and the PCF 103 of FIG. 2 may be the same elements. Further, parts marked by dotted lines in FIG. 2 may be procedures which can be omitted when only signal flow is considered.

Meanwhile, the 5G system may determine a slice-AMBR of S-NSSAI associated with a PDU session in the PDU session establishment procedure and provide the slice-AMBR to the UE 100, the RAN 101 and relevant 5G NFs, for example, SMF1 200, the UPF 202, and the like.

The UE 100 according to an embodiment of the disclosure may be connected to the DN 203 to start the PDU session establishment procedure to transmit and receive data. Referring to FIG. 2, the UE 100 may transmit a PDU session establishment request message to the AMF 102 through the RAN 101 in order to establish a PDU session in operation 210. The PDU session establishment request message may include at least one of a PDU session ID, S-NSSAI to be used by the UE 100, and a DNN.

In operation 212, the AMF 102 may select an SMF which is able to manage the PDU session requested by the UE 100. For example, the AMF 102 may select an SMF supporting the S-NSSAI and/or the DNN requested by the UE 100.

In operation 214, the AMF 102 may transmit a PDU session create request message to selected SMF1 200. The PDU session create request message may include at least one of a PDU session ID, S-NSSAI, a DNN, and a serving network slice-AMBR.

SMF1 200 may generate session management (SM) context. The SM context is a set of information for managing the requested PDU session in operation 214. The SM context may be referred to as an SM context ID. In connection with the SM context, one SM context or a plurality of SM contexts may be allocated to one UE. For example, when a plurality of PDU sessions are allocated to one UE, the SM context may be allocated per PDU session. In this case, a plurality of context IDs may be allocated to one UE.

In operation 216, SMF1 200 may make a request for subscription information of the UE 100 to the UDM 104 and acquire the UE subscription information from the UDM 104. The UE subscription information may include at least one of subscribed S-NSSAI, a subscribed slice-AMBR for the subscribed S-NSSAI, and a subscribed session-AMBR for the subscribed S-NSSAI and a DNN.

SMF1 200 may authenticate the UE request received in operation 214 on the basis of the UE subscription information. For example, SMF1 200 may identify whether the S-NSSAI and/or the DNN requested by the UE included in the PDU session create request message are included in the UE subscription information.

In operation 218, SMF1 200 may transmits a PDU session create response message to the AMF 102. When the authentication performed in operation 216 is successful, the PDU session create response message may include an SM context ID.

The AMF 102 may store the received SM context ID. The AMF 102 may use the SM context ID in order to indicate SM context for the PDU session referred to as the PDU session ID.

In operation 220, SMF1 200 may establish SM policy association with the PCF 103. The PCF 103 establishing the SM policy association with SMF1 200 may be the same as or different from the PCF 103 with which the AMF 102 has established the policy association in the registration procedure. A policy association request message which SMF1 200 transmits to the PCF 103 may include at least one of S-NSSAI, a subscribed slice-AMBR, a serving network slice-AMBR, a subscribed session-AMBR, a SUPI, and an HPLMN ID for PDU session establishment. At this time, the subscribed slice-AMBR may be a subscribed slice-AMBR in the PDU session configured in accordance with specific S-NSSAI. For example, the subscribed slice-AMBR may be a value corresponding to S-NSSAI. That is, when the UE establishes two PDU sessions and the two PDU sessions use the same S-NSSAI, subscribed slice-AMBRs for the two PDU sessions may be the same as each other. Further, the subscribed slice-AMBR is a value stored in the UDM as UE subscription information (UE subscription data) and thus may be always stored in the UDM even though the UE does not establish the PDU session through the corresponding S-NSSAI. Further, the serving network slice-AMBR may be a serving network slice-AMBR used by the serving network for the PDU session.

In operation 222, the PCF 103 may determine an authorized slice-AMBR of the received subscribed slice-AMBR or/and the serving network slice-AMBR on the basis of at least one of the UE subscription information and a local policy. Further, when determining the authorized slice-AMBR, the PCF 103 may consider roaming agreement with the HPLMN of the UE 100. The subscribed slice-AMBR or the serving network slice-AMBR may be the same as or different from the authorized slice-AMBR determined by the PCF 103. Further, the PCF 103 may determine an authorized session-AMBR. The authorized session-AMBR may be a value equal to or smaller than the authorized slice-AMBR. The PCF 103 may transmit a policy association response message to SMF 200 and establish policy association. The policy association response message may include at least one the authorized slice-AMBR and the authorized session-AMBR.

SMF1 200 may determine to use one of the subscribed slice-AMBR, the slice-AMBR modified by the AMF 102 or SMF1 200, the serving network slice-AMBR, or/and the authorized slice-AMBR as the slice-AMBR to be used for S-NSSAI associated with the PDU session. SMF1 200 may add the slice-AMBR to SM context of the UE 100. Further, SMF1 200 may add the session-AMBR to SM context of the UE 100.

In operation 224, SMF1 200 may transmit an N4 session establishment request message in order to establish an N4 session with the UPF 202 selected for PDU session establishment. The N4 session establishment request message which SMF1 200 transmits to UPF1 202 may include at least one of the slice-AMBR and the session-AMBR for the PDU session. UPF1 202 may store the received slice-AMBR and session-AMBR and use the same for controlling downlink data and/or uplink data traffic.

In operation 226, UPF 1 202 may transmit an N4 session establishment response message to SMF1 200.

In operation 228, SMF1 200 may transmit a Namf_Communication_N1N2MessageTransfer message in order to inform the AMF 102 of the PDU session establishment. The Namf_Communication_N1N2MessageTransfer message may include at least one of information which SMF1 200 transmits to the AMF 102, an N2 message which SMF1 200 transmits to the RAN 101, and an N1 message which SMF1 200 transmits to the UE 100.

The information which SMF1 200 transmits to the AMF 102 may include at least one of a PDU session ID, an SM context ID, and a slice-AMBR.

The N2 message which SMF1 200 transmits to the RAN 101 through the AMF 102 may include at least one of a PDU session ID, a session-AMBR, S-NSSAI, and a slice-AMBR.

The N1 message which SMF1 200 transmits to the UE 100 through the AMF 102 and the RAN 101 may include a PDU Session establishment accept message including at least one of the S-NSSAI, the session-AMBR, and the slice-AMBR.

In operation 230, the AMF 102 may transmit a Namf_Communication_N1N2MessageTransfer response message to SMF1 200 in response to the PDU session establishment on the basis of the message received in operation 228.

In operation 232, the AMF 102 may transmit an N2 PDU session request message for session establishment to the RAN 101. The N2 PDU session request message may include the N2 message which the AMF 102 receives from SMF1 200.

The RAN 101 may store the S-NSSAI and the slice-AMBR along with the PDU session ID received in operation 232 and use the same for controlling downlink data and/or uplink data traffic of the PDU session associated with the S-NSSAI. At this time, when the slice-AMBR information for the S-NSSAI exists in the RAN 101 (for example, when the slice-AMBR for the S-NSSAI is acquired in the UE registration procedure as illustrated in operation 122 of FIG. 1 or when RAN configuration information exists), the RAN 101 may use the slice-AMBR information pre-stored in the RAN 101 instead of using the slice-AMBR received in operation 232. According to another embodiment of the disclosure, the RAN 101 may use the slice-AMBR information received in operation 232 instead of using the pre-stored slice-AMBR information.

In operation 234, the RAN 101 may perform an access network (AN)-specific resource setup procedure with the UE 100. In the AN-specific resource setup procedure, the RAN 101 may transmit a PDU session establishment accept message received from the AMF 102 to the UE 100. The UE 100 may store the received slice-AMBR and use the same for controlling uplink data traffic of the PDU session associated with the S-NSSAI. At this time, when the slice-AMBR information for the S-NSSAI exists in the UE 100 (for example, when the slice-AMBR for the S-NSSAI is acquired in the UE registration procedure as illustrated in operation 124 of FIG. 1 or when UE configuration information or UE policy information exists), the UE 100 may use the slice-AMBR information pre-stored in the UE 100 instead of using the slice-AMBR received in operation 234. According to another embodiment of the disclosure, the UE 100 may use the slice-AMBR information received in operation 234 instead of using the pre-stored slice-AMBR information.

SMF1 200 successfully performing the PDU session establishment procedure may register SMF1 200 itself in the UDM 104 as a serving SMF of the PDU session in operation 236. The UDM 104 may store an SMF instance ID of SMF1 200.

The UE 100 may transmit uplink data to the DN 203 via the RAN 101 and the UPF 202. Further, the DN 203 may transmit downlink data to the UE 100 via the UPF 202 and the RAN 101.

Embodiment 2

After establishing the PDU session for S-NSSAI through the procedure illustrated in FIG. 2, the UE according to various embodiments of the disclosure may transmit and receive uplink and downlink data traffic to and from the DN. Further, the UE according to various embodiments of the disclosure may establish another PDU session for the same S-NSSAI. For example, a first PDU session may be established for communication with DN1 203 and a second PDU session may be established for communication with DN2 300. At this time, the first PDU session and the second PDU session are associated with the same S-NSSAI, and thus the 5G system should be able to control a total sum of the uplink and downlink data traffic of the first PDU session and the second PDU session to be equal to or smaller than a total sum of the slice-AMBRs associated with the S-NSSAI. Although two PDU sessions are described in the above example, the same configuration may be applied even when three or more PDU sessions are established according to the various embodiments of the disclosure.

Embodiment 2 describes a method of, when selecting an SMF and a UPF for the second PDU session, selecting the SMF and the UPF which are the same as those in the first PDU session, managing slice-AMBRs for S-NSSAI of the first PDU session and the second PDU session by the SMF and/or the UPF, and controlling a total sum of the uplink and downlink data traffic.

Figure 3A:
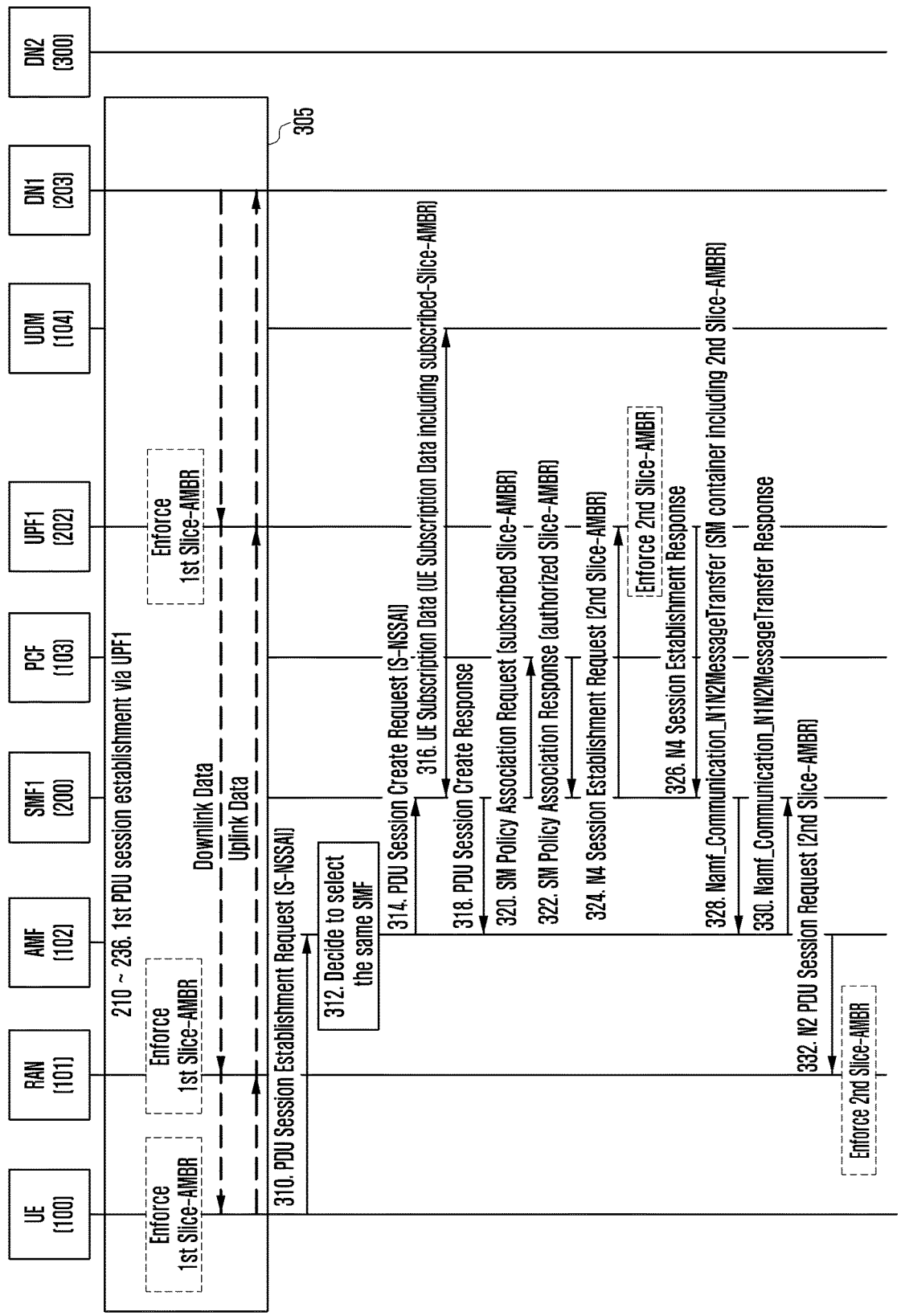
FIGS. 3A and 3B illustrate a PDU session establishment procedure according to an embodiment of the disclosure.
Figure 3B:
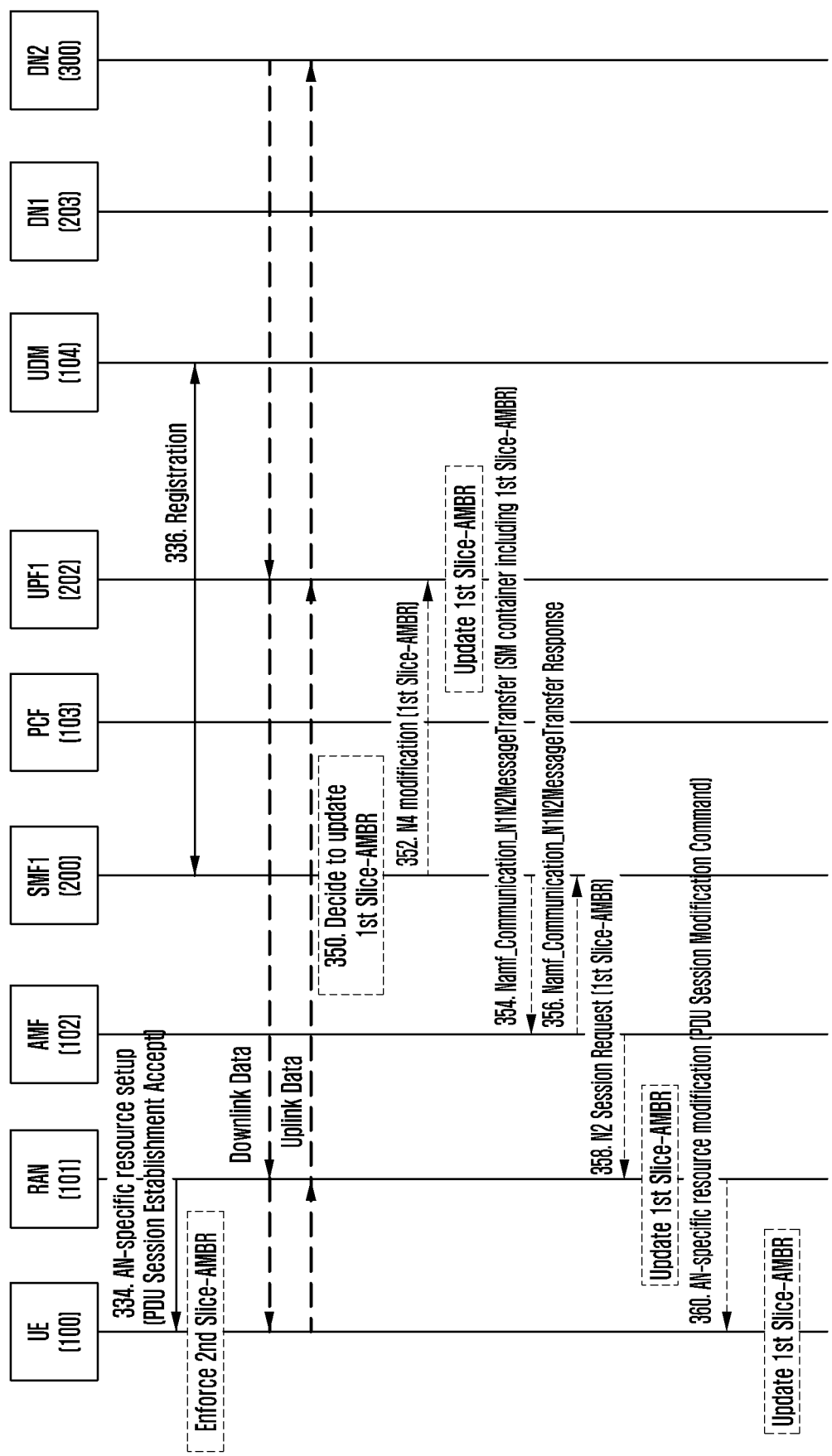

FIGS. 3A and 3B illustrate a PDU session establishment procedure according to an embodiment of the disclosure.

In the description of FIGS. 3A and 3B, FIGS. 3A and 3B may be consecutive signal flowcharts. For example, the operation of FIG. 3B may be performed after the operation of the flowchart in FIG. 3A. However, a particular case in which the order should be changed or omitted will be described separately. Further, the UE 100 and network entities are described in FIGS. 3A and 3B. The UE 100 is located within a specific RAN 101 and may configure a radio channel and communication with the RAN 101. The RAN 101 may be a base station of the 5G network, a base station of LTE or LTE-A, or a network entity serving as a base station in other wireless communication networks as described above. Hereinafter, for convenience of description, it is assumed that the RAN 101 is a 5G base station and a mobile communication system is a 5G wireless communication network. Further, it is assumed that a 5G core network expect for the RAN 101 includes the AMF 102, SMF1 200, the PCF 103, the UPF 202, the UDM 104, DN1 203, and DN2 300. DN1 203 and DN2 300 may be locally or/and physically different DNs. Further, parts marked by dotted lines in FIGS. 3A and 3B may be procedures which can be omitted when only signal flow is considered.

Referring to FIGS. 3A and 3B, the UE 100 may establish a first PDU session for S-NSSAI as described in FIG. 2 and exchange uplink data and/or downlink data traffic with DN1 203 in operation 305. The UE 100, the RAN 101, and UPF 202 may store a slice-AMBR for S-NSSAI and control a data rate of uplink data and/or downlink data traffic in operation 305.

The UE 100 according to an embodiment of the disclosure may determine to establish another PDU session for S-NSSAI, that is, a second PDU session associated with the first PDU session on the basis of at least one of a UE policy and local configuration information of the UE.

In operation 310, the UE 100 may transmit a PDU session establishment request message in order to establish the second PDU session. The PDU session establishment request message may include at least one of a PDU session ID, S-NSSAI to be used by the UE 100, and a DNN. At this time, S-NSSAI included in the PDU session establishment request may be the same as the S-NSSAI for the first PDU session. Further, a DNN included in the PDU session establishment request may be the same as or different from a DNN for the first PDU session.

In operation 312, the AMF 102 may select an SMF which is able to manage the PDU session requested by the UE 100. The AMF 102 according to various embodiments of the disclosure may identify that there is a PDU session, that is, the first PDU Session associated with S-NSSAI requested by the UE 100 on the basis of UE context stored in the AMF 102 and select serving SMF1 200 of the first PDU session as an SMF for the second PDU session.

In operation 314, the AMF 102 may transmit a PDU session create request message to selected SMF1 200. The PDU session create request message may include at least one of a PDU session ID, S-NSSAI, and a DNN. Further, the AMF 102 may insert an SM context ID or a PDU session ID associated with the first PDU session into the PDU session create request message. The AMF 102 may inform SMF1 200 that the second PDU session request is associated with the first PDU session (for example, they are PDU sessions using the same S-NSSAI) by inserting the SM context ID or the PDU session ID linked to the first PDU session into the PDU session create request message.

SMF1 200 may generate SM context for the second PDU session. The SM context is a set of information for managing the requested PDU session in operation 314. The SM context may be referred to as an SM context ID.

In operation 316, SMF1 200 may make a request for subscription information of the UE 100 to the UDM 104 and acquire the UE subscription information from the UDM 104.

The UE subscription information may include at least one of subscribed S-NSSAI, a subscribed slice-AMBR for the subscribed S-NSSAI, and a subscribed session-AMBR for the subscribed S-NSSAI and a DNN. According to another embodiment of the disclosure, SMF1 200 may omit operation 316 and may use the UE subscription information received in operation 216 of FIG. 2.

SMF1 200 may authenticate the UE request received in operation 314 on the basis of the UE subscription information. For example, SMF1 200 may identify whether the S-NSSAI and/or the DNN requested by the UE included in the PDU session create request message are included in the UE subscription information.

In operation 318, SMF 200 may transmits a PDU session create response message to the AMF 102. The PDU session create response message may include an SM context ID for the second PDU session.

The AMF 102 may store the received SM context ID. The AMF 102 may use a second SM context ID in order to indicate SM context for the second PDU session referred to as the second PDU session ID.

In operation 320, SMF1 200 may establish SM policy association for the second PDU session with the PCF 103. The PCF 103 establishing the SM policy association with SMF1 200 may be the same as or different from the PCF 103 with which SMF1 200 has established the policy association in the first PDU session establishment procedure. A policy association request message which SMF1 200 transmits to the PCF 103 may include at least one of S-NSSAI, a subscribed slice-AMBR, a serving network slice-AMBR, a subscribed session-AMBR, a SUPI, and an HPLMN ID for second PDU session establishment. At this time, the subscribed slice-AMBR may be a subscribed slice-AMBR in the second PDU session configured in accordance with the S-NSSAI. For example, the subscribed slice-AMBR may be a value corresponding to the S-NSSAI. That is, when the UE establishes two PDU sessions and the two PDU sessions use the same S-NSSAI, subscribed slice-AMBRs for the two PDU sessions may be the same as each other. Further, the subscribed slice-AMBR is a value stored in the UDM as UE subscription information (UE subscription data) and thus may be always stored in the UDM even though the UE does not establish the PDU session through the corresponding S-NSSAI. Further, the serving network slice-AMBR may be a serving network slice-AMBR used by the serving network for the second PDU session.

In operation 322, the PCF 103 may determine an authorized slice-AMBR of the received subscribed slice-AMBR or the serving network slice-AMBR on the basis of at least one of the UE subscription information and a local policy. Further, when determining the authorized slice-AMBR, the PCF 103 may consider roaming agreement with the HPLMN of the UE. The subscribed slice-AMBR or the serving network slice-AMBR may be the same as or different from the authorized slice-AMBR determined by the PCF 103. Further, the PCF 103 may determine an authorized session-AMBR. The authorized session-AMBR may be a value equal to or smaller than the authorized slice-AMBR. The PCF 103 may transmit a policy association response message to SMF1 200 and establish policy association. The policy association response message may include at least one the authorized slice-AMBR and the authorized session-AMBR.

According to another embodiment of the disclosure, SMF1 200 may use information on the authorized slice-AMBR or the authorized session-AMBR received in operation 222 of FIG. 2.

According to another embodiment of the disclosure, SMF1 200 may use all the information on the authorized slice-AMBR received in operation 222 of FIG. 2 and the authorized session-AMBR received in operation 322.

SMF1 200 may determine slice-AMBRs to be used for the first PDU session and the second PDU session. For example, SMF1 200 may use the slice-AMBR determined during the first PDU session establishment procedure for the second PDU session as illustrated in FIG. 2. According to another embodiment of the disclosure, SMF1 200 may newly determine a slice-AMBR during the second PDU session establishment procedure and, if the newly determined slice-AMBR is different from the slice-AMBR determined during the first PDU session establishment procedure, SMF1 200 may add the slice-AMBR to the SM context of the first PDU session of the UE 100 and may additionally perform, in operation 322, the operation which is the same as the operation described in operation 350.

The slice-AMBR to be used for the first PDU session and the second PDU session may be configured as a sum of the AMBR of the first PDU session and the AMBR of the second PDU session. At this time, when the sum of the AMBR of the first PDU session and the AMBR of the second PDU session is larger than a value of the subscribed slice-AMBR, the serving network slice-AMBR, or the authorized slice-AMBR, SMF1 200 may determine to use, as the slice-AMBR to be used for the first PDU session and the second PDU session, the subscribed slice AMBR or one of the slice-AMBR, the serving network slice-AMBR, and the authorized slice-AMBR modified by the AMF 120 or SMF1 200 on the basis of the subscribed slice-AMBR. SMF1 200 may add the slice-AMBR to the SM context of the second PDU session of the UE 100. Further, SMF1 200 may add the session-AMBR for the second PDU session to the SM context of the second PDU session of the UE 100.

In operation 324, SMF1 200 may establish an N4 session with the UPF 202 selected for second PDU session establishment. For example, SMF1 200 may select the UPF 202 of the first PDU session as the UPF for the second PDU session. The N4 session establishment request message which SMF1 200 transmits to UPF 202 may include at least one of the slice-AMBR and the session-AMBR for the second PDU Session. The UPF 202 may store the received slice-AMBR and session-AMBR and use the same for controlling downlink data and/or uplink data traffic. For example, the UPF 202 may control a sum of the downlink data traffic transmitted through a core network (CN) tunnel used for the first PDU session and the downlink data traffic transmitted through a CN tunnel used for the second PDU session to be smaller than or equal to the received slice-AMBR. When downlink traffic exceeding the slice-AMBR is generated, the UPF 202 may discard some data of the downlink data traffic of the first PDU session and/or the second PDU session.

In operation 326, UPF1 202 may transmit an N4 session establishment response message to SMF1 200.

In operation 328, SMF1 200 may transmit a Namf_Communication_N1N2MessageTransfer message in order to inform the AMF 102 of the PDU session establishment. The Namf_Communication_N1N2MessageTransfer message may include at least one of information which SMF1 200 transmits to the AMF 102, an N2 message which SMF1 200 transmits to the RAN 101, and an N1 message which SMF1 200 transmits to the UE 100.

The information which SMF1 200 transmits to the AMF 102 may include at least one of a PDU session ID, an SM context ID, and a slice-AMBR.

The N2 message which SMF1 200 transmits to the RAN 101 may include at least one of a PDU session ID, a session-AMBR, S-NSSAI, and a slice-AMBR.

The N1 message which SMF1 200 transmits to the UE 100 may include a PDU session establishment accept message including at least one of the S-NSSAI, the session-AMBR, and the slice-AMBR.

In operation 330, the AMF 102 may transmit a Namf_Communication_N1N2MessageTransfer response message to SMF1 200 in response to the PDU session establishment.

In operation 332, the AMF 102 may transmit an N2 PDU session request message to the RAN 101. The N2 PDU session request message may include the N2 message which the AMF 102 receives from SMF1 200.

The RAN 101 may store the S-NSSAI and the slice-AMBR along with the PDU session ID received and use the same for controlling downlink data and/or uplink data traffic of the second PDU session thereafter. For example, the RAN 101 may control a sum of the uplink data traffic or the downlink data traffic of the first PDU session and the uplink data traffic or the downlink data traffic of the second PDU session to be smaller than or equal to the received slice-AMBR. When uplink traffic or downlink traffic exceeding the slice-AMBR is generated, the RAN 101 may discard some data of the data traffic of the first PDU session and/or the second PDU session.

In operation 334, the RAN 101 may perform an AN-specific resource setup procedure with the UE 100. In the AN-specific resource setup procedure, the RAN 101 may transmit a PDU session establishment accept message received from the AMF 102 to the UE 100. The UE 100 may store the received slice-AMBR and use the same for controlling uplink data traffic of the PDU session associated with the S-NSSAI. For example, the UE 100 may control a sum of the uplink data traffic of the first PDU session and the uplink data traffic of the second PDU session to be smaller than or equal to the received slice-AMBR. When uplink data traffic exceeding the slice-AMBR is generated, the UE 100 may first transmit a PDU session and/or data traffic having a higher priority and then transmit a PDU session and/or data traffic having a lower priority later or discard some data.

SMF1 200 successfully performing the PDU session establishment procedure may register SMF 200 itself in the UDM 104 as a serving SMF of the second PDU session in operation 336. The UDM 104 may store an SMF instance ID of SMF1 200.

The UE 100 may transmit uplink data to the DN 203 via the RAN 101 and the UPF 202. Further, the DN 203 may transmit downlink data to the UE 100 via the UPF 202 and the RAN 101.

According to an embodiment of the disclosure, the slice-AMBR determined during the second PDU session establishment procedure may be different from the slice-AMBR determined during the first PDU session establishment procedure. In order to control uplink and/or downlink data traffic for the first PDU session, the UE 100, the RAN 101, and the UPF 202 may use the slice-AMBR during the second PDU session establishment procedure. According to another embodiment of the disclosure, SMF1 200 may perform operation 352 and operation 354 to transmit the changed slice-AMBR to be used for the first PDU Session to UPF1 202 and transmit the changed slice-AMBR to be used for the first PDU session to be used by the UE 100 and the RAN 101 to the AMF 102. Accordingly, the AMF 102 may transmit the changed slice-AMBR to be used for the first PDU session to the RAN 101 in operation 358. The RAN may update the first PDU session and transmit the changed slice-AMBR to be used for the first PDU session to the UE 100 in operation 360.

The UE 100 may use the slice-AMBR received in operation 360 in order to control uplink data traffic of the first PDU session. The RAN 101 may use the slice-AMBR received in operation 358 in order to control uplink and/or downlink data traffic of the first PDU session. The UPF 202 may use the slice-AMBR received in operation 352 in order to control downlink data traffic of the first PDU session.

Embodiment 3

After establishing the PDU session for S-NSSAI through the procedure illustrated in FIG. 2, the UE according to various embodiments of the disclosure may transmit and receive uplink and downlink data traffic to and from the DN. Further, the UE according to various embodiments of the disclosure may establish another PDU session for the same S-NSSAI. For example, a first PDU session may be established for communication with DN1 203 and a second PDU session may be established for communication with DN2 300. At this time, the first PDU session and the second PDU session are associated with the same S-NSSAI, and thus the 5G system should be able to control a total sum of the uplink and downlink data traffic of the first PDU session and the second PDU session to be equal to or smaller than a total sum of the slice-AMBRs associated with the S-NSSAI.

Embodiment 3 describes a method of, when selecting an SMF for the second PDU session, selecting the SMF which is the same as that in the first PDU session, managing slice-AMBRs for S-NSSAI of the first PDU session and the second PDU session by the SMF, and controlling a total sum of the uplink and downlink data traffic. According to the method described embodiment 3, the UPF selected for the first PDU session and the UPF selected for the second PDU session may be different.

Figure 4A:
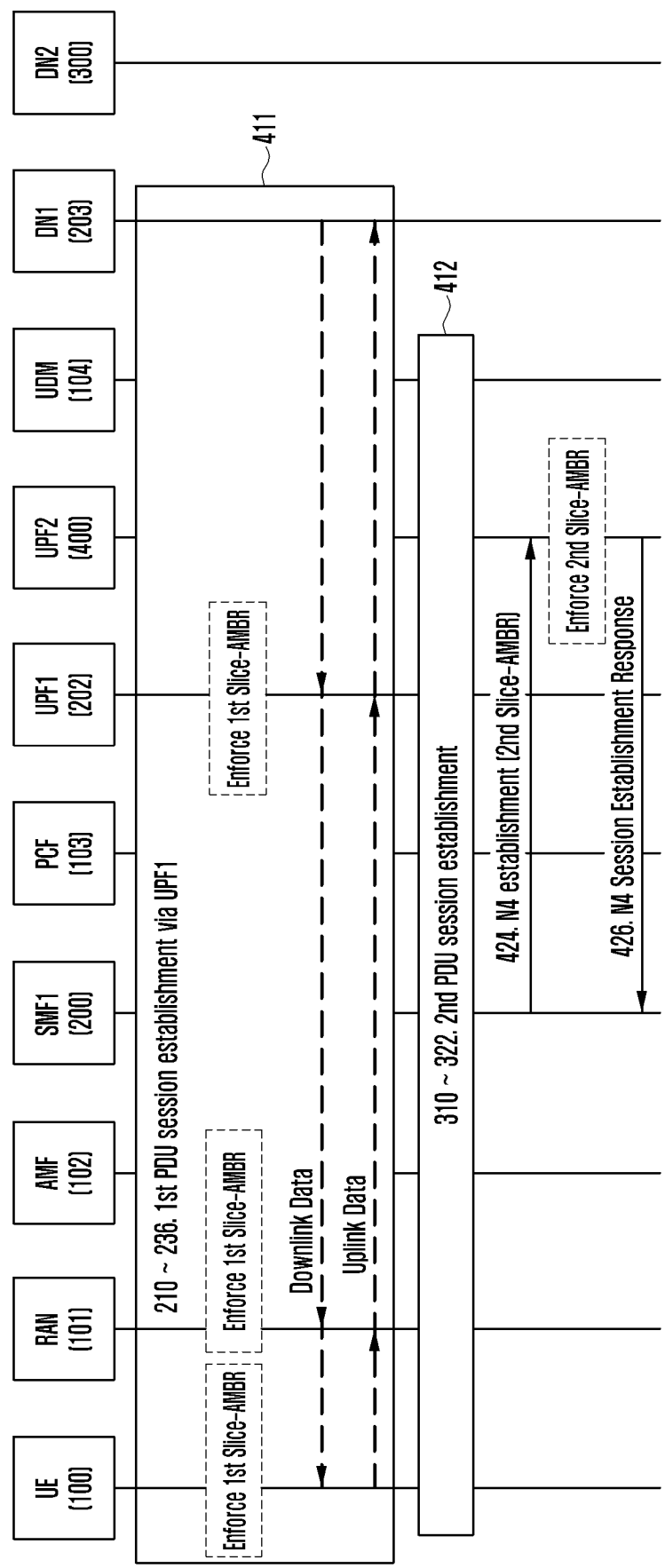
FIGS. 4A and 4B illustrate a PDU session establishment procedure according to an embodiment of the disclosure.
Figure 4B:
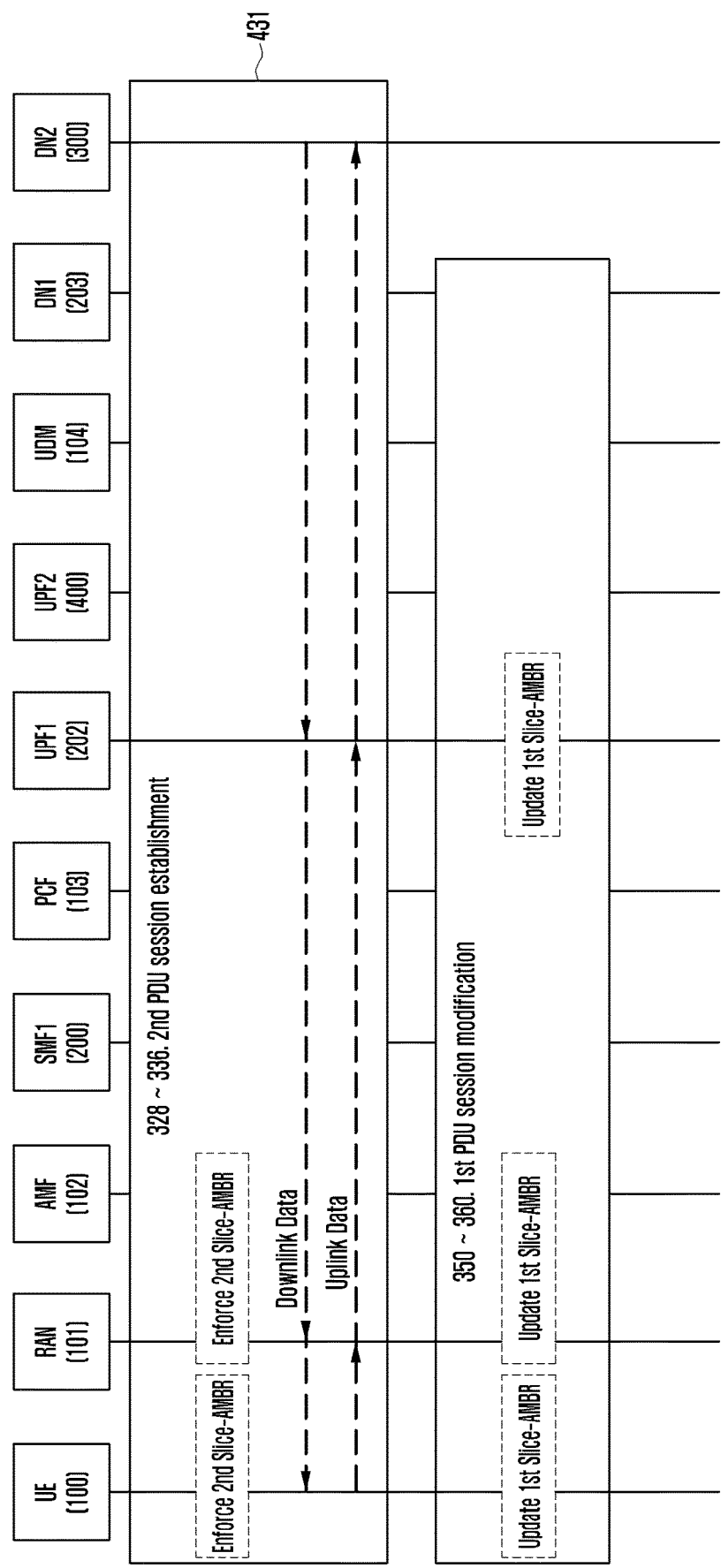

FIGS. 4A and 4B illustrate a PDU session establishment procedure according to an embodiment of the disclosure.

Prior to the description of FIGS. 4A and 4B, FIGS. 4A and 4B are consecutive signal flowcharts. For example, the operation of FIG. 4B may be performed after the operation of the flowchart in FIG. 4A. However, a particular case in which the order should be changed or omitted will be described separately. Further, the UE 100 and network entities are described in FIGS. 4A and 4B. The UE 100 is located within a specific RAN 101 and may configure a radio channel and communication with the RAN 101. The RAN 101 may be a base station of the 5G network, a base station of LTE or LTE-A, or a network entity serving as a base station in other wireless communication networks as described above. Hereinafter, for convenience of description, it is assumed that the RAN 101 is a 5G base station and a mobile communication system is a 5G wireless communication network. Further, it is assumed that a 5G core network expect for the RAN 101 includes the AMF 102, SMF1 200, the PCF 103, UPF1 202, UPF2 400, the UDM 104, DN1 203, and DN2 300. DN1 203 and DN2 300 may be locally or/and physically different DNs. UPF1 202 and UPF2 400 may be logically or/and physically different UPFs. Further, parts marked by dotted lines in FIGS. 4A and 4B may be procedures which can be omitted when only signal flow is considered.

Referring to FIGS. 4A and 4B, the UE 100 may establish the first PDU session for S-NSSAI and start the second PDU session establishment procedure for the same S-NSSAI as illustrated in FIGS. 2, 3A, and 3B. For more detailed description, SMF1 200 may determine slice-AMBRs to be used for the first PDU session and the second PDU session after performing operation 210 to operation 236 of FIG. 2 (operation 411 in the first block of FIG. 4A) and then performing operation 310 to operation 322 of FIGS. 3A and 3B (operation 412 in the second block of FIG. 4A).

SMF1 200 according to an embodiment of the disclosure may determine a session-AMBR for the first PDU session and a session-AMBR for the second PDU session in consideration of the slice-AMBRs.

In operation 424, SMF1 200 may establish an N4 session with the UPF 202 selected for second PDU session establishment. For example, SMF1 200 according to an embodiment of the disclosure may identify that there is a PDU session, that is, the first PDU session associated with the S-NSSAI requested by the UE 100 on the basis of SM context stored in SMF1 200. When a DNN of the first PDU session is different from a DNN requested for second PDU session establishment, SMF1 200 may select different UPFs. Alternatively, when a DNN of the first PDU session is the same as a DNN requested for second PDU session establishment, SMF1 200 may select the same UPF as illustrated in embodiment 2. FIGS. 4A and 4B illustrate the case in which different UPFs are selected.

The N4 session establishment request message which SMF1 200 transmits to UPF 202 may include at least one of the slice-AMBR and the session-AMBR for the second PDU Session. The UPF 400 may store the received slice-AMBR and session-AMBR and use the same for controlling downlink data and/or uplink data traffic.

In operation 426, the UPF 202 may transmit an N4 session establishment response message to SMF1 200.

SMF1 200 receiving the N4 session establishment response message may perform operation 328 to operation 336 of FIGS. 3A and 3B in operation 431.

The RAN 101 may store the S-NSSAI and the slice-AMBR along with the received PDU session ID and use the same for controlling downlink data and/or uplink data traffic of the second PDU session thereafter. For example, the RAN 101 may control a sum of the uplink data traffic and/or the downlink data traffic of the first PDU session and the uplink data traffic and/or the downlink data traffic of the second PDU session to be smaller than or equal to the received slice-AMBR. When uplink traffic or downlink traffic exceeding the slice-AMBR is generated, the RAN 101 may discard some data of the data traffic of the first PDU session and/or the second PDU session.

The UE 100 may store the received slice-AMBR and use the same for controlling uplink data traffic of the PDU session associated with the S-NSSAI. For example, the UE 100 may control a sum of the uplink data traffic of the first PDU session and the uplink data traffic of the second PDU session to be smaller than or equal to the received slice-AMBR. When uplink data traffic exceeding the slice-AMBR is generated, the UE 100 may first transmit a PDU session or data traffic having a higher priority and then transmit a PDU session or data traffic having a lower priority later or discard some data.

According to an embodiment of the disclosure, the session-AMBR allocated per PDU session may be configured as a value smaller than or equal to the slice-AMBR configured to be provided for a specific network slice in the network. UPF1 202 may control downlink data traffic by using the session-AMBR used for the first PDU session and UPF2 400 may control downlink data traffic by using the session-AMBR used for the second PDU session.

When a sum of the session-AMBR of the first PDU session and the session-AMBR of the second PDU session is smaller than or equal to the slice-AMBR, a sum of the downlink data traffic of the first PDU session and the second PDU session transmitted to the RAN 101 via UPF1 202 and UPF2 400 may not exceed the slice-AMBR managed by the RAN 101.

When a sum of the session-AMBR of the first PDU session and the session-AMBR of the second PDU session is larger than the slice-AMBR, a sum of the downlink data traffic of the first PDU session and the second PDU session transmitted to the RAN 101 via UPF1 202 and UPF2 400 may exceed the slice-AMBR managed by the RAN 101. In this case, the RAN 101 may discard some data of the downlink data traffic of the first PDU session and/or the second PDU session.

The UE 100 may transmit uplink data to DN1 203 via the RAN 101 and UPF1 202. Further, DN1 203 may transmit downlink data to the UE 100 via UPF1 202 and the RAN 101.

According to various embodiments of the disclosure, the slice-AMBR determined during the second PDU session establishment procedure may be different from the slice-AMBR determined during the first PDU session establishment procedure. SMF1 200 may perform operation 550 to operation 360 described in FIGS. 3A and 3B. The UE 100, the RAN 101, and UPF1 202 may control uplink and/or downlink data traffic by using the slice-AMBR updated for the first PDU session.

Embodiment 4

After establishing the PDU session for S-NSSAI through the procedure illustrated in FIG. 2, the UE according to various embodiments of the disclosure may transmit and receive uplink and downlink data traffic to and from the DN. Further, the UE according to various embodiments of the disclosure may establish another PDU session for the same S-NSSAI. For example, a first PDU session may be established for communication with DN1 203 and a second PDU session may be established for communication with DN2 300. At this time, the first PDU session and the second PDU session are associated with the same S-NSSAI, and thus the 5G system should be able to control a total sum of the uplink and downlink data traffic of the first PDU session and the second PDU session to be equal to or smaller than a total sum of the slice-AMBRs associated with the S-NSSAI.

Embodiment 4 describes a method by which the AMF manages slice-AMBRs for S-NSSAI of the first PDU session and the second PDU session and controls a total sum of uplink and downlink data traffic. According to the method described in embodiment 4, the SMF and/or the UPF for the first PDU session may be different from the SMF and/or the UPF for the second PDU session.

Figure 5A:
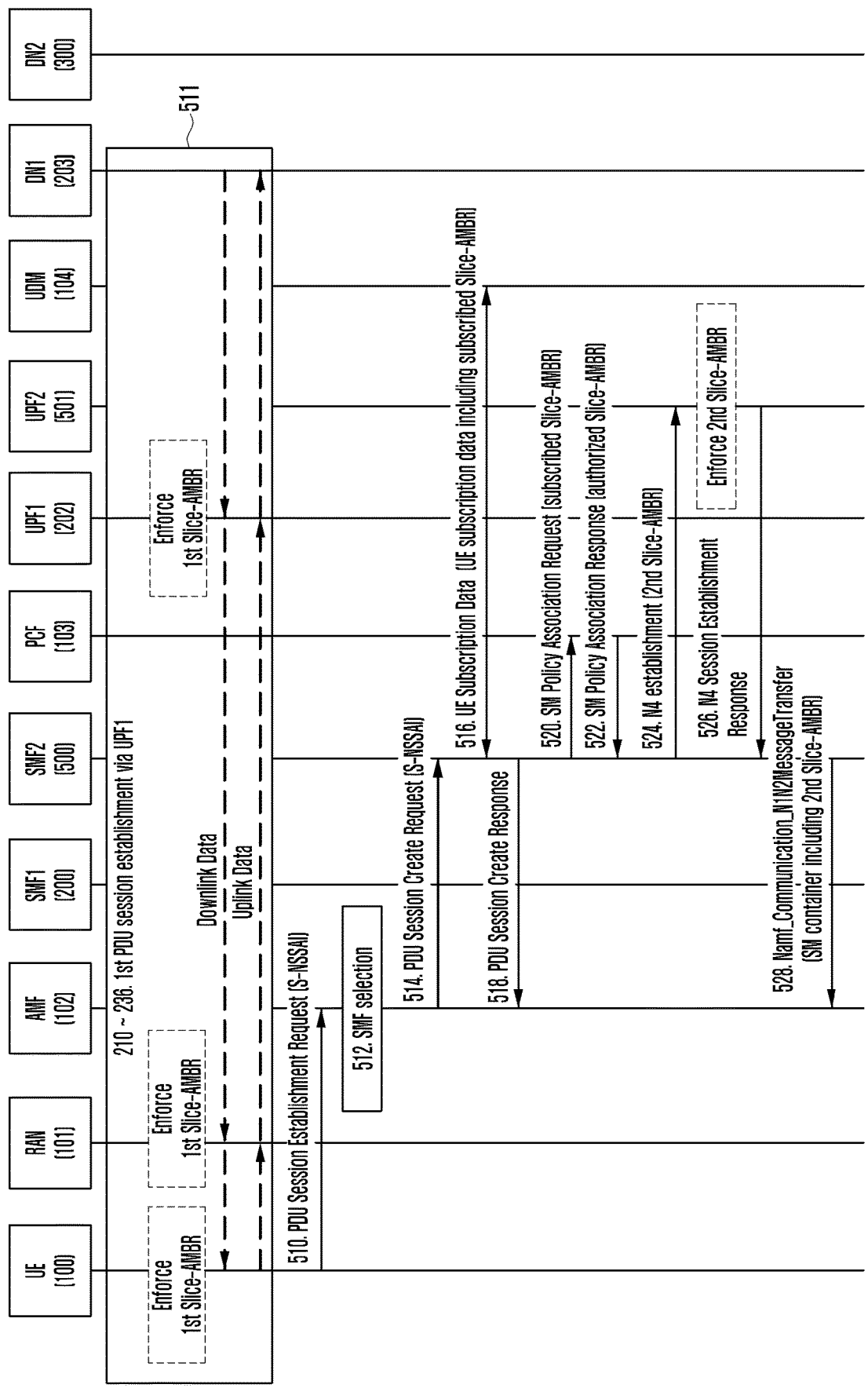
FIGS. 5A and 5B illustrate a PDU session establishment procedure according to an embodiment of the disclosure.
Figure 5B:
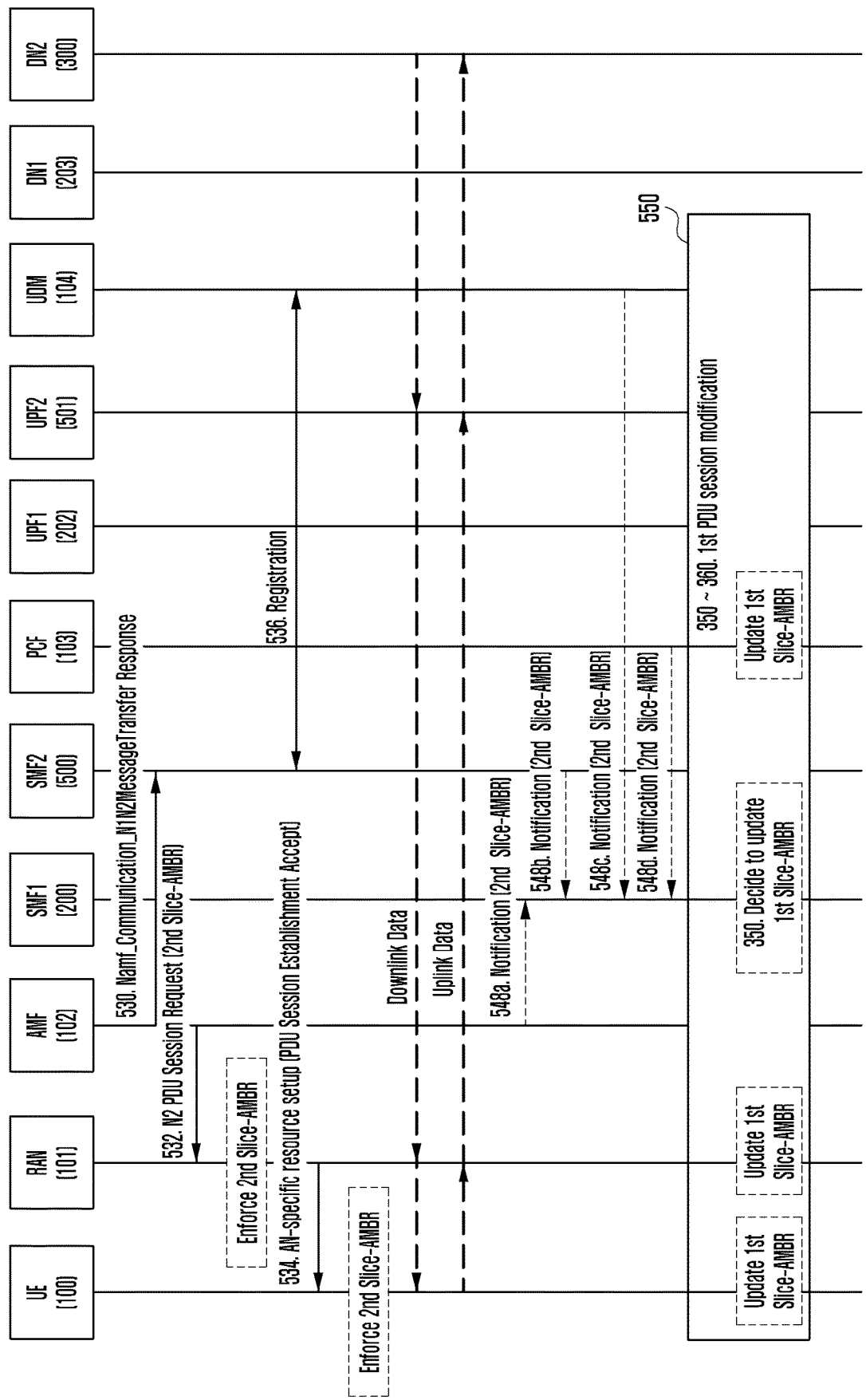

FIGS. 5A and 5B illustrate a PDU session establishment procedure according to an embodiment of the disclosure.

In description of FIGS. 5A and 5B, FIGS. 5A and 5B may be consecutive signal flowcharts. For example, the operation of FIG. 5B may be performed after the operation of the flowchart in FIG. 5A. However, a particular case in which the order should be changed or omitted will be described separately. Further, the UE 100 and network entities are described in FIGS. 5A and 5B. The UE 100 is located within a specific RAN 101 and may configure a radio channel and communication with the RAN 101. The RAN 101 may be a base station of the 5G network, a base station of LTE or LTE-A, or a network entity serving as a base station in other wireless communication networks as described above. Hereinafter, for convenience of description, it is assumed that the RAN 101 is a 5G base station and a mobile communication system is a 5G wireless communication network. Further, it is assumed that a 5G core network expect for the RAN 101 includes the AMF 102, SMF1 200, SMF2 500, the PCF 103, UPF1 202, UPF2 400, the UDM 104, DN1 203, and DN2 300. DN1 203 and DN2 300 may be locally or/and physically different DNs. UPF1 202 and UPF2 400 may be logically or/and physically different UPFs. SMF1 200 and SMF2 500 may be logically or/and physically different SMFs. Further, parts marked by dotted lines in FIGS. 5A and 5B may be procedures which can be omitted when only signal flow is considered. Signal flows marked by dotted lines in FIGS. 5A and 5B may be selected performed or may not be performed.

Referring to FIGS. 5A and 5B, the UE 100 may establish a first PDU session for S-NSSAI as described in FIG. 2 and exchange uplink data and/or downlink data traffic with DN1 203 in operation 511. Accordingly, the UE 100, the RAN 101, and UPF 202 may store a slice-AMBR for S-NSSAI and control a data rate of uplink data and/or downlink data traffic in operation 511.

Meanwhile, as illustrated in FIG. 2 or 3A, the Namf_Communication_N1N2MessageTransfer message which SMF1 200 transmits to the AMF 102 in operation 228 or operation 328 during the first PDU session establishment procedure may include slice-AMBR information and session-AMBR information used for the first PDU session for S-NSSAI. The AMF 102 may store the slice-AMBR information and the session-AMBR information as UE context.

The UE 100 according to an embodiment of the disclosure may determine to establish another PDU session for S-NSSAI, that is, a second PDU session associated with the first PDU session on the basis of at least one of a UE policy and local configuration information of the UE.

In operation 510, the UE 100 may transmit a PDU session establishment request message in order to establish the second PDU session. The PDU session establishment request message for establishing the second PDU session may include at least one of a PDU session ID, S-NSSAI to be used by the UE 100, and a DNN. At this time, S-NSSAI included in the PDU session establishment request may be the same as the S-NSSAI for the first PDU session. Further, a DNN included in the PDU session establishment request may be the same as or different from a DNN for the first PDU session.

In operation 512, the AMF 102 may select an SMF which is able to manage the PDU session requested by the UE 100. For example, the AMF 102 may select an SMF supporting the S-NSSAI and/or the DNN requested by the UE 100. According to an embodiment of the disclosure, the SMF selected by the AMF 102 may different from serving SMF1 200 of the first PDU session.

In operation 514, the AMF 102 may transmit a PDU session create request message to selected SMF2 500. The PDU session create request message may include at least one of a PDU session ID, S-NSSAI, and a DNN. The AMF 102 according to an embodiment of the disclosure may identify that there is a PDU session, that is, the first PDU session associated with the S-NSSAI requested by the UE 100 on the basis of the UE context stored in the AMF 102. The PDU session create request message for establishing the second PDU session may include the slice-AMBR of the first PDU session, the session-AMBR, and the serving SMF of the first PDU session, that is, SMF1 200 ID information which the AMF 102 stores.

SMF2 500 may generate SM context for the second PDU session on the basis of reception of the message in operation 514. The SM context is a set of information for managing the requested PDU session in operation 514. The SM context may be referred to as an SM context ID.

In operation 516, SMF2 500 may make a request for subscription information of the UE 100 to the UDM 104 and acquire the UE subscription information from the UDM 104 in response thereto. The UE subscription information may include at least one of subscribed S-NSSAI, a subscribed slice-AMBR for the subscribed S-NSSAI, and a subscribed session-AMBR for the subscribed S-NSSAI and a DNN.

SMF2 500 may authenticate the UE request received in operation 514 on the basis of the UE subscription information acquired from the UDM 104. For example, SMF2 500 may identify whether the S-NSSAI and/or the DNN requested by the UE included in the PDU session create request message are included in the UE subscription information.

In operation 518, SMF2 500 may transmits a PDU session create response message to the AMF 102. The PDU session create response message may include an SM context ID for the second PDU session.

The AMF 102 may store the SM context ID received in operation 518. The AMF 102 may use a second SM context ID in order to indicate SM context for the second PDU session referred to as the second PDU session ID.

In operation 520, SMF2 500 may establish SM policy association for the second PDU session with the PCF 103. The PCF 103 establishing the SM policy association with SMF2 200 may be the same as or different from the PCF 103 with which SMF1 200 has established the policy association in the first PDU session establishment procedure. A policy association request message which SMF2 500 transmits to the PCF 103 may include at least one of S-NSSAI, a subscribed slice-AMBR, a serving network slice-AMBR, a subscribed session-AMBR, a SUPI, and an HPLMN ID for second PDU session establishment. At this time, the subscribed slice-AMBR may be a subscribed slice-AMBR for the S-NSSAI for the second PDU session. Further, the serving network slice-AMBR may be a serving network slice-AMBR used by the serving network for the second PDU session.

In operation 522, the PCF 103 may determine an authorized slice-AMBR of the received subscribed slice-AMBR or the serving network slice-AMBR on the basis of at least one of the UE subscription information and a local policy. Further, when determining the authorized slice-AMBR, the PCF 103 may consider roaming agreement with the HPLMN of the UE. The subscribed slice-AMBR or the serving network slice-AMBR may be the same as or different from the authorized slice-AMBR determined by the PCF 103. Further, the PCF 103 may determine an authorized session-AMBR. The authorized session-AMBR may be a value equal to or smaller than the authorized slice-AMBR. The PCF 103 may transmit a policy association response message to SMF2 500 and establish policy association. The policy association response message may include at least one the authorized slice-AMBR and the authorized session-AMBR.

SMF2 500 may determine slice-AMBRs to be used for the first PDU session and the second PDU session. SMF2 500 may determine the slice-AMBR on the basis of at least one of the slice AMBR and the session-AMBR of the first PDU Session received in operation 514 and the slice-AMBR and the session-AMBR for the second PDU session received in operation 516 to operation 522. For example, SMF2 500 may determine to use the slice-AMBR received from the AMF 102 in operation 514 for the second PDU session. According to another embodiment of the disclosure, SMF1 200 may newly determine the slice-AMBR during the second PDU session establishment procedure. SMF2 500 may determine the slice-AMBR in the similar way to that described in embodiment 2 to embodiment 3. For example, the slice-AMBR to be used for the first PDU session and the second PDU session may be configured as a sum of the AMBR of the first PDU session and the AMBR of the second PDU session. At this time, when the sum of the AMBR of the first PDU session and the AMBR of the second PDU session is larger than a value of the subscribed slice-AMBR, the serving network slice-AMBR, or the authorized slice-AMBR, SMF1 200 may determine to use, as the slice-AMBR to be used for the first PDU session and the second PDU session, the subscribed slice AMBR or one of the slice-AMBR, the serving network slice-AMBR, and the authorized slice-AMBR modified by the AMF 120 or SMF1 200 on the basis of the subscribed slice-AMBR. SMF2 500 may add the slice-AMBR to the SM context of the second PDU session of the UE 100. SMF2 500 may add the session-AMBR for the second PDU session to the SM context of the second PDU session of the UE 100.

In operation 524, SMF2 500 may establish an N4 session with the UPF 501 selected for second PDU session establishment. The N4 session establishment request message which SMF2 500 transmits to UPF2 501 may include at least one of the slice-AMBR and the session-AMBR for the second PDU session. UPF2 501 may store the received slice-AMBR and session-AMBR and use the same for controlling downlink data and/or uplink data traffic thereafter.

In operation 526, UPF2 501 may transmit an N4 session establishment response message to SMF2 500.

In operation 528, SMF2 500 may transmit a Namf_Communication_N1N2MessageTransfer message in order to inform the AMF 102 of the session establishment with UPF2 500. The Namf_Communication_N1N2MessageTransfer message may include at least one of information which SMF2 500 transmits to the AMF 102, an N2 message which SMF2 500 transmits to the RAN 101, and an N1 message which SMF2 500 transmits to the UE 100.

The information which SMF2 500 transmits to the AMF 102 may include at least one of a PDU session ID, an SM context ID, a slice-AMBR, and a session-AMBR. When the slice-AMBR received in operation 528 is different from the slice-AMBR being used by the first PDU session which the AMF 102 stores, the AMF 102 may update the slice-AMBR of the first PDU session of the UE 100 which the AMF 102 stores to be the newly received slice-AMBR.

The N2 message which SMF1 200 transmits to the RAN 101 through the AMF 102 may include at least one of a PDU session ID, a session-AMBR, S-NSSAI, and a slice-AMBR.

The N1 message which SMF1 200 transmits to the UE 100 through the AMF 102 and the RAN 101 may include a PDU Session establishment accept message including at least one of the S-NSSAI, the session-AMBR, and the slice-AMBR.

In operation 530, the AMF 102 may transmit a Namf_Communication_N1N2MessageTransfer response message to SMF2 500 in response to the message for the session establishment with UPF2 500.

In operation 532, the AMF 102 may transmit an N2 PDU session request message to the RAN 101 for the second PDU session. The N2 PDU session request message may include the N2 message which the AMF 102 receives from SMF2 500.

The RAN 101 may store the S-NSSAI and the slice-AMBR along with the PDU session ID received and use the same for controlling downlink data and/or uplink data traffic of the second PDU session thereafter. For example, the RAN 101 may control a sum of the uplink data traffic or the downlink data traffic of the first PDU session and the uplink data traffic or the downlink data traffic of the second PDU session to be smaller than or equal to the received slice-AMBR. When uplink traffic or downlink traffic exceeding the slice-AMBR is generated, the RAN 101 may discard some data of the data traffic of the first PDU session and/or the second PDU session.

In operation 534, the RAN 101 may perform an AN-specific resource setup procedure with the UE 100 according to the second PDU session establishment. In the AN-specific resource setup procedure, the RAN 101 may transmit a PDU session establishment accept message received from the AMF 102 to the UE 100. The UE 100 may store the received slice-AMBR and use the same for controlling uplink data traffic of the PDU session associated with the S-NSSAI. For example, the UE 100 may control a sum of the uplink data traffic of the first PDU session and the uplink data traffic of the second PDU session to be smaller than or equal to the received slice-AMBR. When uplink data traffic exceeding the slice-AMBR is generated, the UE 100 may first transmit a PDU session or data traffic having a higher priority and then transmit a PDU session or data traffic having a lower priority later or discard some data.

SMF2 500 successfully performing the second PDU session establishment procedure may register SMF2 500 itself in the UDM 104 as the serving SMF of the second PDU session in operation 536. The UDM 104 may store an SMF instance ID of SMF2 500.

The UE 100 may transmit uplink data to the DN 501 via the RAN 101 and the UPF 202. Further, the DN 203 may transmit downlink data to the UE 100 via the UPF 501 and the RAN 101.

According to various embodiments of the disclosure, the slice-AMBR determined during the second PDU session establishment procedure may be different from the slice-AMBR determined during the first PDU session establishment procedure. In order to control uplink and/or downlink data traffic for the first PDU session, the UE 100 and the RAN 101 may use the slice-AMBR received during the second PDU session establishment procedure. Since UPF1 202 is not involved in the second PDU session, slice-AMBR information of UPF1 202 may need to be updated. Accordingly, AMF 102 or SMF2 500 may update the slice-AMBR of the first PDU session being used by the UE 100, the RAN 101, and UPF1 202.

For example, the AMF 102 may compare the slice-AMBR for the S-NSSAI received in operation 528 with the slice-AMBR for S-NSSAI stored in the AMF 102. When the slice-AMBR for the S-NSSAI received in operation 528 is different from the slice-AMBR for S-NSSAI stored in the AMF 102, the AMF 102 may determine to change the slice-AMBR of the first PDU session into the latest slice-AMBR value, that is, the slice-AMBR received in operation 528. Accordingly, the AMF 102 may transmit the latest slice-AMBR value to SMF1 200 which is the serving SMF of the first PDU session in operation 548*a*.

According to another embodiment of the disclosure, determining the slice-AMBR of the second DPU session, SMF2 500 may compare the slice-AMBR for S-NSSAI received in operation 514 with the slice-AMBR newly determined by SMF2 500. When the slice-AMBR for the S-NSSAI received in operation 514 is different from the slice-AMBR determined by SMF2 500, SMF2 500 may determine to change the slice-AMBR of the first PDU session into the latest slice-AMBR value, that is, the slice-AMBR determined to be used for the second PDU session after operation 514. Accordingly, the SMF2 500 may transmit the latest slice-AMBR value to SMF1 200 by using serving SMF information of the first session received in operation 514 in operation 548*b*.

SMF1 200 receiving the latest slice-AMBR may determine to update the slice-AMBR of the first PDU session as illustrated in operation 350 of FIG. 3B described above. Accordingly, in operation 550, NFs including SMF1 200 may perform the operation like operation 350 to operation 360 described in FIGS. 3A and 3B. Thereafter, the UE 100, the RAN 101, and UPF1 202 may control uplink and/or downlink data traffic by using the slice-AMBR updated for the first PDU session.

Embodiment 5

After establishing the PDU session for S-NSSAI through the procedure illustrated in FIG. 2, the UE according to various embodiments of the disclosure may transmit and receive uplink and downlink data traffic to and from the DN. Further, the UE according to various embodiments of the disclosure may establish another PDU session for the same S-NSSAI. For example, a first PDU session may be established for communication with DN1 203 and a second PDU session may be established for communication with DN2 300. At this time, the first PDU session and the second PDU session are associated with the same S-NSSAI, and thus the 5G system should be able to control a total sum of the uplink and downlink data traffic of the first PDU session and the second PDU session to be equal to or smaller than a total sum of the slice-AMBRs associated with the S-NSSAI.

Embodiment 5 describes a method by which the UDM manages slice-AMBRs for S-NSSAI of the first PDU session and the second PDU session and controls a total sum of uplink and downlink data traffic. According to the method described in embodiment 5, the SMF and/or the UPF for the first PDU session may be different from the SMF and/or the UPF for the second PDU session.

Embodiment 5 is described using the PDU session establishment procedure of FIGS. 5A and 5B described above.

Referring to FIGS. 5A and 5B, the UE 100 may establish a first PDU session for S-NSSAI as described in FIG. 2 and exchange uplink data and/or downlink data traffic with DN1 203 in operation 511. The UE 100, the RAN 101, and UPF1 202 may store a slice-AMBR for S-NSSAI and control a data rate of uplink data and/or downlink data traffic in operation 511.

A registration message which SMF1 200 transmits to the UDM 104 may include slice-AMBR information and session-AMBR information used by the first PDU session for S-NSSAI during the first PDU session establishment procedure as illustrated in operation 236 of FIG. 2. The UDM 104 may store the slice-AMBR information and the session-AMBR information as SM data of the UE.

The UE 100 according to an embodiment of the disclosure may determine to establish another PDU session for S-NSSAI, that is, a second PDU session associated with the first PDU session on the basis of at least one of a UE policy and local configuration information of the UE.

In operation 510, the UE 100 may transmit a PDU session establishment request message in order to establish the second PDU session. The PDU session establishment request message may include at least one of a PDU session ID, S-NSSAI to be used by the UE 100, and a DNN. At this time, S-NSSAI included in the PDU session establishment request may be the same as the S-NSSAI for the first PDU session. Further, a DNN included in the PDU session establishment request may be the same as or different from a DNN for the first PDU session.

In operation 512, the AMF 102 may select an SMF which is able to manage the PDU session requested by the UE 100. For example, the AMF 102 may select an SMF supporting the S-NSSAI and/or the DNN requested by the UE 100. According to various embodiments of the disclosure, the SMF selected by the AMF 102 may be different from serving SMF1 200 of the first PDU session.

In operation 514, the AMF 102 may transmit a PDU session create request message to selected SMF2 500. The PDU session create request message may include at least one of a PDU session ID, S-NSSAI, and a DNN.

SMF2 500 may generate SM context for the second PDU session. The SM context is a set of information for managing the requested PDU session in operation 514. The SM context may be referred to as an SM context ID.

In operation 516, SMF2 500 may make a request for subscription information of the UE 100 to the UDM 104 and acquire the UE subscription information from the UDM 104 in response thereto. The UE subscription information may include at least one of subscribed S-NSSAI, a subscribed slice-AMBR for the subscribed S-NSSAI, and a subscribed session-AMBR for the subscribed S-NSSAI and a DNN. The UDM 104 according to various embodiments of the disclosure may provide information related to the first PDU Session of the UE 100 (for example, slice-AMBR and/or session-AMBR being used for the first PDU session) to SMF2 500.

SMF2 500 may authenticate the UE request received in operation 514 on the basis of the UE subscription information. For example, SMF2 500 may identify whether the S-NSSAI and/or the DNN requested by the UE 100 included in the PDU session create request message are included in the UE subscription information.

In operation 518, SMF2 500 may transmits a PDU session create response message to the AMF 102. The PDU session create response message may include an SM context ID for the second PDU session.

The AMF 102 may store the received SM context ID. The AMF 102 may use a second SM context ID in order to indicate SM context for the second PDU session referred to as the second PDU session ID.

In operation 520, SMF2 500 may establish SM policy association for the second PDU session with the PCF 103. The PCF 103 establishing the SM policy association with SMF2 200 may be the same as or different from the PCF 103 with which SMF1 200 has established the policy association in the first PDU session establishment procedure. A policy association request message which SMF2 500 transmits to the PCF 103 may include at least one of S-NSSAI, a subscribed slice-AMBR, a serving network slice-AMBR, a subscribed session-AMBR, a SUPI, and an HPLMN ID for second PDU session establishment. At this time, the subscribed slice-AMBR may be a subscribed slice-AMBR for the S-NSSAI for the second PDU session. Further, the serving network slice-AMBR may be a serving network slice-AMBR used by the serving network for the second PDU session.

In operation 522, the PCF 103 may determine an authorized slice-AMBR of the received subscribed slice-AMBR or the serving network slice-AMBR on the basis of at least one of the UE subscription information and a local policy. Further, when determining the authorized slice-AMBR, the PCF 103 may consider roaming agreement with the HPLMN of the UE. The subscribed slice-AMBR or the serving network slice-AMBR may be the same as or different from the authorized slice-AMBR determined by the PCF 103. Further, the PCF 103 may determine an authorized session-AMBR. The authorized session-AMBR may be a value equal to or smaller than the authorized slice-AMBR. The PCF 103 may transmit a policy association response message to SMF2 500 and establish policy association. The policy association response message may include at least one the authorized slice-AMBR and the authorized session-AMBR.

SMF2 500 may determine slice-AMBRs to be used for the first PDU session and the second PDU session. SMF2 500 may determine the slice-AMBR on the basis of at least one of the slice AMBR and the session-AMBR being used by the first PDU session received from the UDM 104 in operation 516 and the slice-AMBR and the session-AMBR for the second PDU session received in operation 516 to operation 522. For example, SMF2 500 may determine to use the slice-AMBR currently used by the first PDU session received from the UDM 102 in operation 516 for the second PDU session. Alternatively, SMF2 500 may newly determine the slice-AMBR during the second PDU session establishment procedure. SMF2 500 may determine the slice-AMBR in the similar way to that described in embodiment 2 to embodiment 3. For example, the slice-AMBR to be used for the first PDU session and the second PDU session may be configured as a sum of the AMBR of the first PDU session and the AMBR of the second PDU session. At this time, when the sum of the AMBR of the first PDU session and the AMBR of the second PDU session is larger than a value of the subscribed slice-AMBR, the serving network slice-AMBR, or the authorized slice-AMBR, SMF1 200 may determine to use, as the slice-AMBR to be used for the first PDU session and the second PDU session, the subscribed slice AMBR or one of the slice-AMBR, the serving network slice-AMBR, and the authorized slice-AMBR modified by the AMF 120 or SMF1 200 on the basis of the subscribed slice-AMBR. SMF2 500 may add the slice-AMBR to the SM context of the second PDU session of the UE 100. SMF2 500 may add the session-AMBR for the second PDU session to the SM context of the second PDU session of the UE 100.

Operation 524 to operation 526 follow the method described in embodiment 4.

In operation 528, SMF2 500 may transmit a Namf_Communication_N1N2MessageTransfer message in order to inform the AMF 102 of the second PDU session establishment. The Namf_Communication_N1N2MessageTransfer message may include at least one of information which SMF2 500 transmits to the AMF 102, an N2 message which SMF2 500 transmits to the RAN 101, and an N1 message which SMF2 500 transmits to the UE 100.

The information which SMF2 500 transmits to the AMF 102 may include at least one of a PDU session ID, an SM context ID, a slice-AMBR, and a session-AMBR.

The N2 message which SMF2 500 transmits to the RAN 101 through the AMF 102 may include at least one of a PDU session ID, a session-AMBR, S-NSSAI, and a slice-AMBR.

The N1 message which SMF2 500 transmits to the UE 100 through the AMF 102 and the RAN 101 may include a PDU Session establishment accept message including at least one of the S-NSSAI, the session-AMBR, and the slice-AMBR.

In operation 530, the AMF 102 may transmit a Namf_Communication_N1N2MessageTransfer response message to SMF2 500 in response to reception of the message for the second PDU session.

Operation 532 to operation 534 follow the method described in embodiment 4.

SMF2 500 successfully performing the second PDU session establishment procedure may register SMF2 500 itself in the UDM 104 as the serving SMF of the second PDU session in operation 536. SMF2 500 according to various embodiments of the disclosure may insert the latest slice-AMBR indicating the use of S-NSSAI into the registration message. The UDM 104 according to various embodiments of the disclosure may store an SMF instance ID of SMF2 500 and store the latest slice-AMBR currently used for S-NSSAI.

According to various embodiments of the disclosure, the slice-AMBR determined during the second PDU session establishment procedure may be different from the slice-AMBR determined during the first PDU session establishment procedure. In order to control uplink and/or downlink data traffic for the first PDU session, the UE 100 and the RAN 101 may use the slice-AMBR received during the second PDU session establishment procedure. Since UPF1 202 is not involved in the second PDU session, slice-AMBR information of UPF1 202 may need to be updated. Accordingly, the UDM 104 may update the slice-AMBR of the first PDU session being used by the UE 100, the RAN 101, and UPF1 202.

For example, the UDM 104 may compare the slice-AMBR for the S-NSSAI received in operation 536 with the slice-AMBR for S-NSSAI stored in the UDM 104. When the slice-AMBR for the S-NSSAI received in operation 536 is different from the slice-AMBR for S-NSSAI stored in the UDM 104, the UDM 104 may determine to change the slice-AMBR of the first PDU session into the latest slice-AMBR value, that is, the slice-AMBR received in operation 536. Accordingly, the UDM 104 may transmit the latest slice-AMBR value to SMF1 200 which is the serving SMF of the first PDU session in operation 548c.

SMF1 200 receiving the latest slice-AMBR may determine to update the slice-AMBR of the first PDU session as illustrated in operation 350 of FIG. 3B described above in operation 550. In operation 550, SMF1 200 may perform operation 350 to operation 360 described in FIGS. 3A and 3B. The UE 100, the RAN 101, and the UPF 202 may control uplink and/or downlink data traffic by using the slice-AMBR updated for the first PDU session in operation 550.

Embodiment 6

After establishing the PDU session for S-NSSAI through the procedure illustrated in FIG. 2, the UE according to various embodiments of the disclosure may transmit and receive uplink and downlink data traffic to and from the DN. Further, the UE according to various embodiments of the disclosure may establish another PDU session for the same S-NSSAI. For example, a first PDU session may be established for communication with DN1 203 and a second PDU session may be established for communication with DN2 300. At this time, the first PDU session and the second PDU session are associated with the same S-NSSAI, and thus the 5G system should be able to control a total sum of the uplink and downlink data traffic of the first PDU session and the second PDU session to be equal to or smaller than a total sum of the slice-AMBRs associated with the S-NSSAI.

Embodiment 6 describes a method of, when selecting a PCF for the second PDU session, selecting the PCF which is the same as that in the first PDU session, managing slice-AMBRs for S-NSSAI of the first PDU session and the second PDU session by the PCF, and controlling a total sum of the uplink and downlink data traffic. According to the method described in embodiment 6, the SMF and/or the UPF for the first PDU session may be different from the SMF and/or the UPF for the second PDU session.

Embodiment 6 is described using the PDU session establishment procedure of FIGS. 5A and 5B described above.

Referring to FIGS. 5A and 5B, the UE 100 may establish a first PDU session for S-NSSAI as described in FIG. 2 and exchange uplink data and/or downlink data traffic with DN1 203 in operation 511. Accordingly, the UE 100, the RAN 101, and UPF 202 may store a slice-AMBR for S-NSSAI and control a data rate of uplink data and/or downlink data traffic in operation 511.

As illustrated in FIG. 3A, the Namf_Communication_N1N2MessageTransfer message which SMF1 200 transmits to the AMF 102 during the first PDU session establishment procedure in operation 328 may include PCF information having policy association with SMF1 200 for the first PDU session, that is, an ID of the PCF 103. The AMF 102 may store information on the ID of the PCF 103 as UE context in operation 511.

The UE 100 according to an embodiment of the disclosure may determine to establish another PDU session for S-NSSAI, that is, a second PDU session associated with the first PDU session on the basis of at least one of a UE policy and local configuration information of the UE.

In operation 510, the UE 100 may transmit a PDU session establishment request message in order to establish the second PDU session. The PDU session establishment request message may include at least one of a PDU session ID, S-NSSAI to be used by the UE 100, and a DNN. At this time, S-NSSAI included in the PDU session establishment request message may be the same as the S-NSSAI for the first PDU session. Further, a DNN included in the PDU session establishment request may be the same as or different from a DNN for the first PDU session.

In operation 512, the AMF 102 may select an SMF which is able to manage the PDU session requested by the UE 100. For example, the AMF 102 may select an SMF supporting the S-NSSAI and/or the DNN requested by the UE 100. According to various embodiments of the disclosure, the SMF selected by the AMF 102 may be different from serving SMF1 200 of the first PDU session.

In operation 514, the AMF 102 may transmit a PDU session create request message to the selected SMF 500. The PDU session create request message may include at least one of a PDU session ID, S-NSSAI, and a DNN. The AMF 102 according to an embodiment of the disclosure may identify that there is a PDU session, that is, the first PDU session associated with the S-NSSAI requested by the UE 100 on the basis of the UE context stored in the AMF 102. The PDU session create request message may include PCF ID information of the first PDU session which the AMF 102 stores.

SMF2 500 may generate SM context for the second PDU session. The SM context is a set of information for managing the requested PDU session in operation 514. The SM context may be referred to as an SM context ID.

In operation 516, SMF2 500 may make a request for subscription information of the UE 100 to the UDM 104 and acquire UE subscription information from the UDM 104 in response thereto. The UE subscription information acquired from the UDM 104 may include at least one of subscribed S-NSSAI, a subscribed slice-AMBR for the subscribed S-NSSAI, and a subscribed session-AMBR for the subscribed S-NSSAI and a DNN.

SMF2 500 may authenticate the UE request received in operation 514 on the basis of the UE subscription information. For example, SMF2 500 may identify whether the S-NSSAI and/or the DNN requested by the UE included in the PDU session create request message are included in the UE subscription information.

In operation 518, the SMF 500 may transmits a PDU session create response message to the AMF 102. The PDU session create response message may include an SM context ID for the second PDU session.

The AMF 102 may store the received SM context ID. The AMF 102 may use a second SM context ID in order to indicate SM context for the second PDU session referred to as the second PDU session ID.

In operation 520, SMF2 500 may establish SM policy association for the second PDU session with the PCF. SMF2 500 may select the PCF 103 which is the same as that for the first PDU session as the PCF establishing SM policy association for the second PDU session by using the PCF ID information of the first PDU session received in operation 514. A policy association request message which SMF2 500 transmits to the PCF 103 may include at least one of S-NSSAI, a subscribed slice-AMBR, a serving network slice-AMBR, a subscribed session-AMBR, a SUPI, and an HPLMN ID for second PDU session establishment. At this time, the subscribed slice-AMBR may be a subscribed slice-AMBR for the S-NSSAI for the second PDU session. Further, the serving network slice-AMBR may be a serving network slice-AMBR used by the serving network for the second PDU session.

In operation 522, the PCF 103 may determine an authorized slice-AMBR of the received subscribed slice-AMBR or the serving network slice-AMBR on the basis of at least one of the UE subscription information and a local policy. The PCF 103 according to various embodiments of the disclosure may consider not only the information received in operation 520 but also the slice-AMBR currently used by the first PDU session in order to determine the authorized slice-AMBR. Further, when determining the authorized slice-AMBR, the PCF 103 may consider roaming agreement with the HPLMN of the UE. The subscribed slice-AMBR or the serving network slice-AMBR may be the same as or different from the authorized slice-AMBR determined by the PCF 103. Further, the PCF 103 may determine an authorized session-AMBR. The authorized session-AMBR may be a value equal to or smaller than the authorized slice-AMBR. The PCF 103 may transmit a policy association response message to SMF2 500 and establish policy association. The policy association response message may include at least one the authorized slice-AMBR and the authorized session-AMBR. The authorized slice-AMBR or the authorized session-AMBR newly determined by the PCF 103 may be the same as or different from the slice-AMBR or the session-AMBR currently used by the first PDU session.

SMF2 500 may determine the slice-AMBR to be used for the second PDU session. The SMF 500 may determine the slice-AMBR on the basis of at least one of the slice-AMBR and the session-AMBR for the second PDU session received in operation 516 to operation 522. For example, SMF2 500 may determine to use the slice-AMBR received from the PCF 103 in operation 522 for the second PDU session. SMF2 500 may add the slice-AMBR to the SM context of the second PDU session of the UE 100. SMF2 500 may add the session-AMBR for the second PDU session to the SM context of the second PDU session of the UE 100.

Operation 524 to operation 534 follow the method described in embodiment 5.

Operation 536 follows the method described in embodiment 4.

According to various embodiments of the disclosure, the slice-AMBR determined during the second PDU session establishment procedure may be different from the slice-AMBR determined during the first PDU session establishment procedure. In order to control uplink and/or downlink data traffic for the first PDU session, the UE 100 and the RAN 101 may use the slice-AMBR received during the second PDU session establishment procedure. Since the UPF 202 is not involved in the second PDU session, slice-AMBR information of the UPF 202 may need to be updated. Accordingly, the PCF 103 may perform the slice-AMBR update procedure of the first PDU session being used by the UE 100, the RAN 101, and the UPF 202.

For example, the PCF 103 may transmit the latest slice-AMBR value determined in operation 520 to operation 522 to SMF1 200 which is the serving SMF of the first PDU session in operation 548d.

SMF1 200 receiving the latest slice-AMBR may determine to update the slice-AMBR of the first PDU session as illustrated in operation 350 of FIG. 3B described above in operation 550. In operation 550, SMF1 200 may perform operation 350 to operation 360 described in FIGS. 3A and 3B. The UE 100, the RAN 101, and UPF1 202 may control uplink and/or downlink data traffic by using the slice-AMBR updated for the first PDU session in operation 550.

Embodiment 7

The UE according to various embodiments of the disclosure may establish a PDU session and exchange data with a DN in a connected state. The UE may make a state change to an idle state, and a 5G system may release radio resources between the UE and the RAN while maintaining the PDU session in a deactivated state.

Embodiment 7 describes a method of configuring a slice-AMBR related to the PDU session in the UE, the RAN, and 5G NFs in a procedure of changing the PDU session to an activated state.

Figure 6:
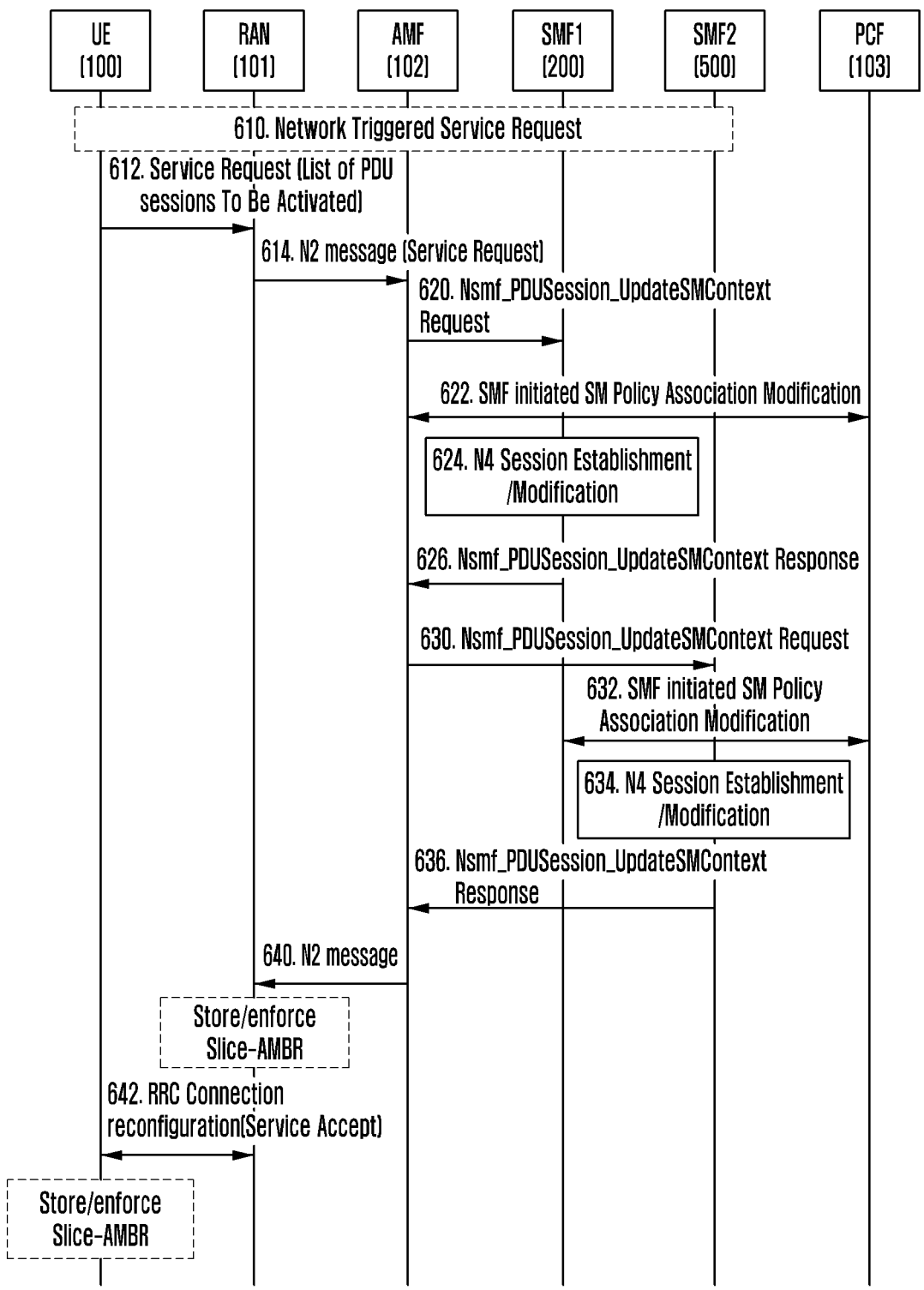
FIG. 6 illustrates a service request procedure according to an embodiment of the disclosure.

FIG. 6 illustrates a service request procedure according to an embodiment of the disclosure.

Prior to description with reference to FIG. 6, a UE 100 and network entities are described. The UE 100 is located within a specific RAN 101 and may configure a radio channel and communication with the RAN 101. The RAN 101 may be a base station of the 5G network, a base station of LTE or LTE-A, or a network entity serving as a base station in other wireless communication networks as described above. Hereinafter, for convenience of description, it is assumed that the RAN 101 is a 5G base station and a mobile communication system is a 5G wireless communication network. Further, it is assumed that the 5G core network except for the RAN 101 includes the AMF 102, the PCF 103, SMF1 200, and SMF2 500. In FIG. 6 described below, parts marked by dotted lines may be a procedure which can be omitted.

Referring to FIG. 6, downlink data traffic may be generated from a DN. At this time, when the corresponding PDU session is in a deactivated state, the network may transmit a paging message or a NAS notification message to the UE 100 in operation 610. The UE 100 receiving the paging message or/and the NAS notification message may transmit a service request message in operation 612. Alternatively, in order to transmit uplink data traffic, the UE 100 in the idle state may transmit the service request message in operation 612. The service request message may include at least one of a list of PDU sessions to be activated and a list of allowed PDU sessions. The list of PDU sessions to be activated and/or the list of allowed PDU sessions may include one or more pieces of PDU session information through which the UE and/or the DN transmits data.

In operation 614, the RAN 101 may transmit the received service request message to the AMF 102. The AMF 102 may select a PDU session to be switched to the activated state on the basis of the received list of PDU sessions to be activated and/or list of allowed PDU sessions. For example, the AMF 102 may determine to switch the first PDU session and the second PDU session to the activated state according to various embodiment of the disclosure. The AMF 102 may determine that the first PDU session and the second PDU session are associated with the same S-NSSAI.

In operation 620 and operation 630, the AMF 102 may transmit a Nsmf_PDUSession_UpdateSMContext Request message to the serving SMF of the PDU session to be switched to the activated state. For example, the AMF 102 may determine to switch the first PDU session and the second PDU session to the activated state and transmit the Nsmf_PDUSession_UpdateSMContext Request message to each of SMF1 200 which is the serving SMF of the first PDU session and SMF2 500 which is the serving SMF of the second PDU session according to an embodiment of the disclosure. The Nsmf_PDUSession_UpdateSMContext Request message transmitted to each serving SMF may include slice-AMBR information for S-NSSAI associated with the PDU session.

In operation 622 and operation 632, SMF1 200 and SMF2 500 may perform a policy association modification procedure with the PCF 103. The PCF 103 may provide slice-AMBR information for S-NSSAI associated with PDU session to SMF1 200 and SMF2 500.

In operation 624 and operation 634, SMF1 200 and SMF2 500 may select UPFs for the first PDU session or/and the second PDU session and perform an N4 session establishment or N4 session modification procedure. SMF1 200 or/and SMF2 500 may transmit slice-AMBR information for each PDU session to the corresponding UPF (not shown in FIG. 6). The slice-AMBR information may be a slice-AMBR value acquired in operation 620 to operation 622 or/and operation 630 to operation 632 or a slice-AMBR value determined by the corresponding SMF.

In operation 626 and operation 636, SMF1 200 and SMF2 500 may transmit a Nsmf_PDUSession_UpdateSMContext Response message to the AMF 102. The Nsmf_PDUSession_UpdateSMContext Response message may include slice-AMBR information for S-NSSAI associated with each PDU session.

As described above, when both SMFs 200 and 500 or only one of them exist and the Nsmf_PDUSession_UpdateSMContextResponse message is received from the corresponding SMF of the different SMFs 200 and 500, the AMF 102 may transmit an N2 message to the RAN 101 in operation 640. The N2 message may include information related to the PDU session activated by the service request procedure. For example, S-NSSAI information associated with activated PDU session may be included. Further, slice-AMBR information associated with each piece of the S-NSSAI may be included. For example, when the first PDU session and the second PDU session are activated by the service request procedure, the slice-AMBR may be configured as sum of the first PDU session and the second PDU session. Alternatively, session-AMBR information associated with each PDU session may be included.

The RAN 101 may store the information received from the AMF 102 and use the same for controlling uplink and downlink data traffic thereafter. For example, the RAN 101 may store the received S-NSSAI and the slice-AMBR associated with the S-NSSAI. According to another embodiment of the disclosure, the RAN 101 may calculate and store the slice-AMBR for S-NSSAI on the basis of the received session-AMBR.

In operation 642, the RAN 101 may perform an RRC connection reconfiguration procedure with the UE 100. At this time, the RAN 101 may transmit a service accept message received from the AMF 102 to the UE 100 in operation 640. The service accept message may include information related to the PDU session activated by the service request procedure. For example, S-NSSAI information associated with activated PDU session may be included. Further, slice-AMBR information associated with each S-NSSAI may be included. For example, when the first PDU session and the second PDU session are activated by the service request procedure, the slice-AMBR may be configured as sum of the first PDU session and the second PDU session. Alternatively, session-AMBR information associated with each PDU session may be included.

The UE 100 may store the information received from the RAN 101 and use the same for controlling uplink and downlink data traffic thereafter. For example, the UE 100 may store the received S-NSSAI and the slice-AMBR associated with the S-NSSAI. Alternatively, the UE 100 may calculate and store the slice-AMBR for S-NSSAI on the basis of the received session-AMBR.

Figure 7:
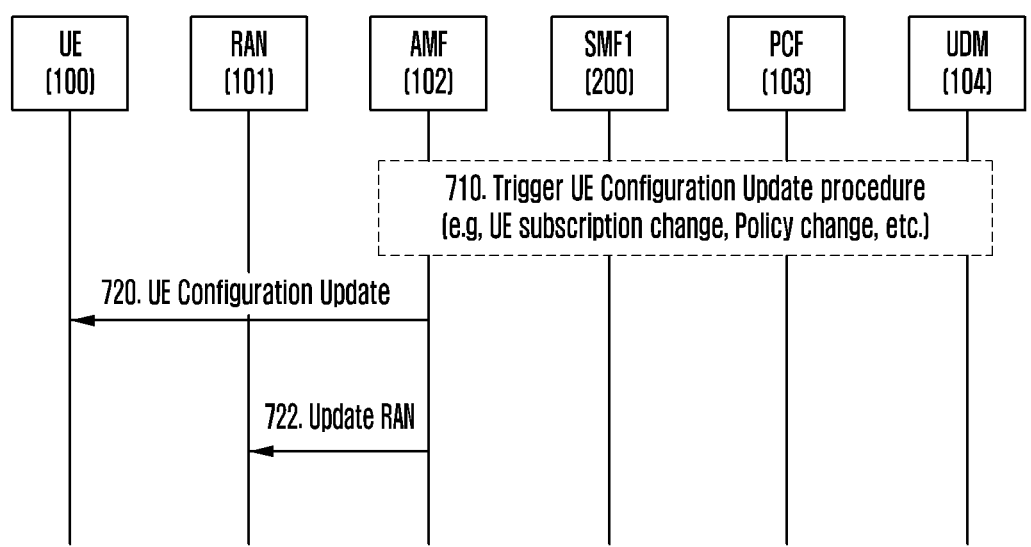
FIG. 7 illustrates a UE configuration update procedure according to an embodiment of the disclosure.

FIG. 7 illustrates a UE configuration update procedure according to an embodiment of the disclosure.

Prior to description with reference to FIG. 7, a UE 100 and network entities are described. The UE 100 is located within a specific RAN 101 and may configure a radio channel and communication with the RAN 101. The RAN 101 may be a base station of the 5G network, a base station of LTE or LTE-A, or a network entity serving as a base station in other wireless communication networks as described above. Hereinafter, for convenience of description, it is assumed that the RAN 101 is a 5G base station and a mobile communication system is a 5G wireless communication network. Further, it is assumed that the 5G core network except for the RAN 101 includes the AMF 102, the PCF 103, SMF1 200, and the UDM 104.

Referring to FIG. 7, in operation 710, the 5G core network may change the slice-AMBR associated with S-NSSAI. For example, the UDM 104 may change the slice-AMBR due to a change in the UE subscription information. Alternatively, for example, the PCF 103 may change the slice-AMBR due to the policy information change. Alternatively, for example, SMF1 300 or the AMF 102 may change the slice-AMBR due to the change in the state of the PDU session.

In operation 720, the AMF 102 may transmit the changed information to the UE 100. For example, the AMF 102 may transmit S-NSSAI and slice-AMBR information associated with the S-NSSAI.

The UE 100 may store the received information and use the same for controlling uplink data traffic of the PDU session associated with the S-NSSAI thereafter.

In operation 722, the AMF 102 may transmit the changed information to the RAN 101. For example, the AMF 102 may transmit the UE ID, the S-NSSAI, and slice-AMBR information associated with the S-NSSAI.

The RAN 101 may store the received information and use the same for controlling uplink or downlink data traffic of the PDU session associated with the S-NSSAI thereafter.

Embodiment 8

Figure 10:
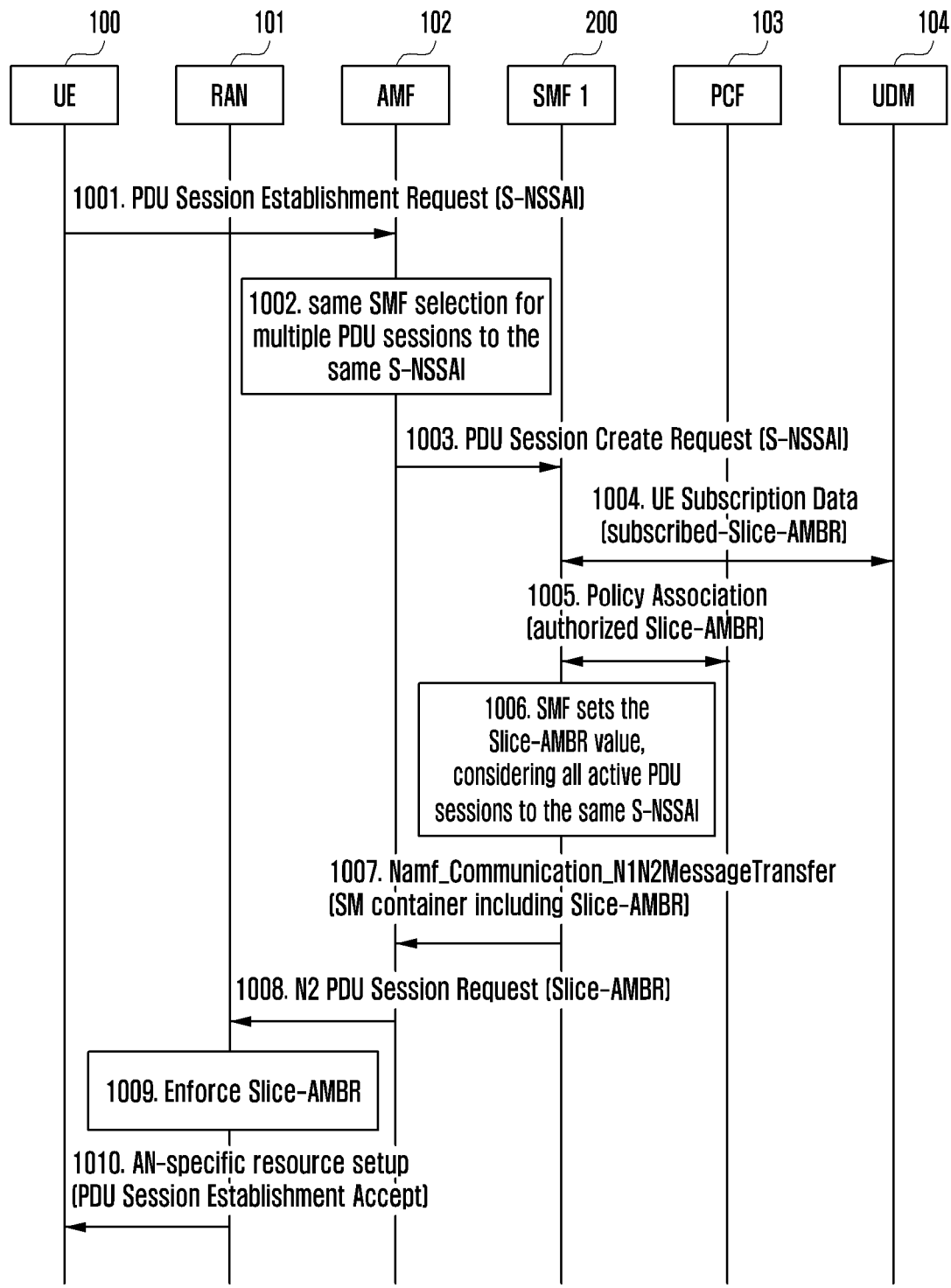
FIG. 10 illustrates a PDU session establishment procedure according to various embodiments of the disclosure.

FIG. 10 illustrates a PDU session establishment procedure according to various embodiments of the disclosure.

In operation 1001, the UE 100 may transmit a PDU Session Establishment Request message to the AMF 102. The PDU Session Establishment Request message may include S-NSSAI which is network slice information which the UE 100 desires to use.

In operation 1002, the AMF 102 may select an SMF supporting the S-NSSAI received in operation 1001. The AMF 102 may determine whether all PDU sessions for S-NSSAI should be supported for the same SMF or an SMF belonging to the same SMF set (SMF within the same SMF set) on the basis of at least one of the local policy of the AMF 102, the slice policy acquired from the PCF 103, and UE subscription data acquired from the UDM 104. When all sessions for S-NSSAI should be supported for the same SMF or SMFs belonging to the same SMF set, the AMF 102 may select the same SMF for the S-NSSAI or the SMF belonging to the same SMF set. For example, when the AMF 102 has never selected the SMF for the S-NSSAI, a new SMF may be selected. According to another embodiment, when the AMF 102 has previously selected the SMF for the S-NSSAI or has a history of selecting the SMF and stores previously selected SMF information (for example, an SMF ID, an SMF instance ID, or an SMF set ID), the AMF 102 may perform the following procedure with an SMF corresponding to the previously selected and stored information (for example, an SMF (the same SMF) which is the same as the previously selected SMF or another SMF (a SMF within the same SMF set) belonging to the same SMF set to which the previously selected SMF belongs). According to another embodiment, the AMF 102 may receive SMF information (for example, an SMF ID, an SMF instance ID, or an SMF set ID) supporting the S-NSSAI acquired from a NRF (not shown), the PCF 103, or the UDM 104 (for example, SMF information included in SMF selection subscription data) and perform the following procedure with an SMF corresponding to the received information (for example, an SMF indicated by the SMF ID or the SMF instance ID or an SMF belonging to the SMF set indicated by the SMF set ID).

SMFs belonging to the same SMF set according to an embodiment of the disclosure may share PDU session-related information (for example, SM context) managed by respective SMFs.

In operation 1003, the AMF 102 may transmit a PDU session create request message to SMF1 200 selected in operation 1002. The PDU session create request message may include S-NSSAI information.

In operation 1004, SMF1 200 may receive UE subscription information (for example, UE subscription data and session management subscription data) from the UDM 104. The UE subscription information may include a subscribed-slice-AMBR per S-NSSAI. When the UE 100 previously established the PDU session by the same S-NSSAI and is currently using the same and when SMF1 200 stores PDU session information which the UE established and is currently using or may acquire PDU session information which the UE 100 established and is currently using from another SMF, SMF1 200 may omit operation 1004. The subscribed-slice-AMBR may be a value obtained by adding a guaranteed bit rate (GBR or GBR QoS flows) and a non-guaranteed bit rate (non-GBR or non-GBR QoS flows). Alternatively, the subscribed-slice-AMBR may be a value including only non-GBR (or non-GBR QoS flows).

In operation 1005, SMF1 200 may establish policy association with the PCF 103. SMF1 200 may transmit at least one of the subscribed-slice-AMBR and the subscribed-session-AMBR of the UE 100 to the PCF 103. The PCF 103 may determine the authorized-slice-AMBR on the basis of at least one of the information received from SMF1 200, the local policy of a mobile communication service provider, the UE subscription information, and the roaming agreement.

For example, the PCF 103 may determine the authorized-slice-AMBR for non-GBR QoS flows in consideration of a data bit rate being used by Guaranteed bit rate (GBR) QoS flows associated with S-NSSAI being used by the UE 100. When the UE 100 is using/making a request for one or more PDU sessions by the S-NSSAI, the PCF 103 may determine the authorized-slice-AMBR in consideration of GBR QoS flows included in all PDU sessions.

The PCF 103 may transmit the determined authorized-slice-AMBR to SMF1 200 as described in the method.

If the UE 100 previously established the PDU session by the same S-NSSAI and is using the same and SMF1 200 can store or acquire PDU session information which the UE 200 established and is using, SMF1 200 may omit operation 1005.

In operation 1006, SMF1 200 may determine the slice-AMBR for S-NSSAI on the basis of information received from the AMF 102 in operation 1003, information received from the UDM 104 in operation 1004, and information received from the PCF 103 in operation 1005.

For example, SMF1 200 may configure the slice-AMBR for non-GBR QoS flows as a sum of session-AMBR values of all PDU sessions with active user plane associated with the S-NSSAI. Further, SMF1 200 may configure the slice-AMBR value not to exceed the subscribed-slice-AMBR. That is, for example, when the sum of the session-AMBR values of all PDU sessions with active user plane associated with S-NSSAI is larger than the subscribed-slice-AMBR or the authorized-slice-AMBR, the SMF may configure the slice-AMBR for non-GBR QoS flows to be the subscribed-slice-AMBR or the authorized-slice-AMBR.

For example, SMF1 200 may determine the slice-AMBR for non-GBR QoS flows in consideration of GBR QoS flows included in the PDU session associated with S-NSSAI. If the subscribed-slice-AMBR received from the UDM 104 is 100 Mega bit per second (Mbps) and GBR QoS flows use 60 Mbps, the SMF may configure the slice-AMBR for non-GBR QoS flows to be a value except for GBR QoS flows from all subscribed-slice-AMBRs, that is, 40 Mbps.

In another example, SMF1 200 may determine the slice-AMBR for non-GBR QoS flows in consideration of GBR QoS flows of all PDU sessions used/requested by the UE associated with S-NSSAI. If the subscribed-slice-AMBR received from the UDM 104 is 100 Mega bit per second (Mbps), GBR QoS flows of the first PDU session using S-NSSAI use 40 Mbps, and GBR QoS flows of the second PDU session using the same S-NSSAI use 35 Mbps, the SMF may configure the slice-AMBR for the non-GBR QoS flows to be a value except for the GBR QoS flows of all PDU sessions from all subscribed-slice-AMBRs, that is, for example, 25 Mbps.

In another example, the UE 100 may has made the request for/has established the PDU session for S-NSSAI by accessing the AMF 102 through the 3GPP access network (AN) (for example, NR or E-UTRA) and may make a request for/establish the PDU Session for S-NSSAI by accessing the AMF 102 through the non-3GPP access network (for example, Wi-Fi). That is, the UE 100 may use the PDU session for S-NSSAI through the 3GPP access network and use the PDU session for the same S-NSSAI through the non-3GPP access network. The AMF 102 may insert access network information of the UE into the message transmitted to SMF1 200 in operation 1003. SMF1 200 may be aware of the access network of the requested PDU sessions on the basis of the information received in operation 1003. SMF1 200 may divide the slice-AMBRs into a value which can be used in the 3GPP access network and a value which can be used in the non-3GPP access network. For example, when the slice-AMBR is 40 Mbps, the SMF may configure the slice-AMBR which can be used in the 3GPP access network to be 30 Mbps and the slice-MABR which can be used in the non-3GPP access network to be a value except for the value, which can be used in the 3GPP access network, from all slice-AMBRs, that is, 10 Mbps.

In operation 1007, SMF1 200 may transmit the slice-AMBR determined in operation 1006 to the AMF. At this time, the slice-AMBR transmitted by SMF1 200 may vary depending on the type of the access network (for example, the 3GPP access network or the non-3GPP access network). Alternatively, the slice-AMBR transmitted by SMF1 200 may be the same value regardless of the type of the access network.

In operation 1008, the AMF 102 may transmit the slice-AMBR received from SMF1 200 in operation 1007 to the RAN 101.

In operation 1009, the RAN 101 may apply the received slice-AMBR (slice-AMBR enforcement). For example, the RAN 101 may control a sum of maximum uplink data rates (maximum uplink data throughput) of one or more non-GBR QoS flows associated with S-NSSAI up to the slice-AMBR. Further, the RAN 101 may control a sum of maximum downlink data rates (maximum downlink data throughput) of one or more non-GBR QoS flows associated with S-NSSAI up to the slice-AMBR.

In operation 1010, the RAN 101 may transmit the PDU session establishment accept message received from the AMF 102 in operation 1008 to the UE 100.

When the slice-AMBR is included in the PDU session establishment accept message, the UE may control a sum of the maximum uplink data rates of non-GBR QoS flows of all PDU sessions associated with S-NSSAI up to the slice-AMBR.

Embodiment 9

The AMF 102 according to an embodiment of the disclosure may select an SMF supporting S-NSSAI in operation 212 of FIG. 2, operation 312 of FIG. 3A, operation 512 of FIG. 5A, or operation 1002 of FIG. 10.

In a method by which the AMF 102 selects the SMF, the AMF 102 may determine an SMF selection method on the basis of subscription data received from the UDM 104 in operation 116 of FIG. 1. The subscription data may include SMF selection subscription information (selection subscription data). The SMF selection subscription data may include information (for example, an indication) indicating whether the same SMF should be selected for multiple PDU sessions associated with the same S-NSSAI.

The AMF 102 according to an embodiment of the disclosure may identify whether the SMF selection subscription data received in operation 116 of FIG. 1 indicates selection of the same SMF for multiple PDU sessions during the PDU session establishment procedure illustrated in FIG. 2, 3A, 5A, or 10 in operation 212 of FIG. 2, operation 312 of FIG. 3A, operation 512 of FIG. 5A, operation 1002 of FIG. 10.

According to an embodiment of the disclosure, when the SMF selection subscription data indicates selection of the same SMF for multiple PDU sessions, the AMF 102 may identify whether the SMF for the S-NSSAI having received the request for PDU session establishment has been already selected in operation 212 of FIG. 2, operation 312 of FIG. 3A, operation 512 of FIG. 5A, operation 1002 of FIG. 10.

If there is the SMF already selected for the S-NSSAI and stored in the AMF 102, the AMF 102 may select the stored SMF. Through the above method, the AMF 102 may use the same SMF for multiple PDU sessions (or additional PDU sessions) for the S-NSSAI.

If there is no SMF previously selected for the S-NSSAI, the AMF 102 may newly select the SMF. The AMF 102 may store newly selected SMF information.

According to an embodiment of the disclosure, when the SMF selection subscription data does not indicate selection of the same SMF for multiple PDU sessions, the AMF 102 may newly select the SMF in operation 212 of FIG. 2, operation 312 of FIG. 3A, operation 512 of FIG. 5A, operation 1002 of FIG. 10. The AMF 102 may store newly selected SMF information.

The slice-AMBR according to an embodiment of the disclosure may mean a total data transmission rate (aggregate bit rate) provided in GBR QoS flows and non-GBR QoS flows for all PDU sessions associated with S-NSSAI or may be used to define the limit of the aggregate bit rate.

The network or NFs (for example, the SMF, the PCF, the UDM, the AMF, the NSSF, the NWDAF, and the RAN) according to an embodiment of the disclosure may allow the remainder except for the aggregate bit rate of the GBR QoS flows from the slice-AMBRs to the non-GBR QoS flows. For example, the aggregate bit rate of the non-GBR QoS flows may be a total sum of session-AMBRs of all PDU sessions associated with S-NSSAI. Further, when the total sum of the session-AMBRs is larger than the remainder except for the aggregate bit rate of the GBR QoS flows from the slice-AMBRs, the network or NFs (for example, the SMF, the PCF, the UDM, the AMF, the NSSF, the NWDAF, and the RAN) according to an embodiment of the disclosure may limit the aggregate bit rate of the non-GBR QoS flows to the remainder except for the aggregate bit rate of the GBR QoS flows from the slice-AMBRs. The aggregate bit rate of the GBR QoS flows may be a total sum of MFBRs of the GBR QoS flows of all PDU sessions associated with S-NSSAI. In another example, the aggregate bit rate of the GBR QoS flows may be a total sum of GFBRs of the GBR QoS flows of all PDU sessions associated with S-NSSAI.

The network or NFs (for example, the SMF, the PCF, the UDM, the AMF, the NSSF, the NWDAF, and the RAN) according to an embodiment of the disclosure may control the session-AMBR of each PDU session on the basis of status information of the PDU Session associated with S-NSSAI (for example, activated, inactivated, deactivated, or released). For example, when the UE is using the first PDU session and the second PDU session associated with the same S-NSSAI, the network or the NF may limit a sum of the session-AMBR of the first PDU Session and the session-AMBR of the second PDU session to the remainder except for the aggregate bit rate of the GBR QoS flows from the slice-AMBRs. Thereafter, when the status of the second PDU session is changed and the changed status information means that the second PDU session is not currently used (for example, the status of the first PDU session is changed from the activated state to the deactivated state), the network or the NF may identify (determine) that a data rate used as the session-AMBR of the second PDU session is not currently used. Accordingly, the network or the NF may change the data rate used as the session-AMBR of the second DPU session to be used as the session-AMBR of the PDU session currently in the activated state (for example, the first PDU session). The network or the NF may transmit the changed session-AMBR to other NFs (for example, the SMF, the PCF, the UDM, the AMF, the NSSF, and the NWDAF) and/or the RAN. Another NF or the RAN receiving the changed session-AMBR may control the data rate of the corresponding PDU session according to the newly received session-AMBR, that is, the changed session-AMBR.

Referring to FIG. 2, the UE 100 may establish the first PDU session with the first DN 203 according to the procedure illustrated in FIG. 2. For example, the first PDU session may be a PDU session established for S-NSSAI and a first data network name (DNN).

In operation 216, SMF1 200 may acquire slice-AMBR information for the first PDU session from the UDM 104. For example, the slice-AMBR may be slice-AMBR information for S-NSSAI. Further, SMF1 200 may acquire first session-AMBR information for the first PDU session from the UDM 104. For example, the first session-AMBR may be session-AMBR information for the S-NSSAI and the first DNN.

Referring to FIG. 3A, the UE 100 may establish the second PDU session with the second DN 300 according to the procedure illustrated in FIG. 3A. For example, the second PDU session may be a PDU session established with the S-NSSAI and the second DNN.

In operation 312, the AMF 102 may determine to select SMF1 200 which is the same as SMF1 200 selected for the first PDU session in operation 212 of FIG. 2 as a serving SMF of the second PDU session. For example, the AMF 102 may make such a decision on the basis of information received from the UDM 104 in operation 116 of FIG. 1. For example, the subscription information which the UDM 104 transmits to the AMF 102 in operation 116 of FIG. 1 may include information (for example, an indication) indicating selection of the same NFs (for example, the SMF and the PCF) for the S-NSSAI. The AMF 102 may select the SMF 200 by using serving SMF information of the first PDU session which the AMF 102 stores.

In operation 316, SMF1 200 may acquire slice-AMBR information for the second PDU session from the UDM 104. For example, the slice-AMBR may be slice-AMBR information for S-NSSAI. In another example, SMF1 200 may use the slice-AMBR information acquired for the S-NSSAI in operation 216. Further, SMF1 200 may acquire second session-AMBR information for the second PDU session from the UDM 104. For example, the second session-AMBR may be session-AMBR information for the S-NSSAI and the second DNN.

According to an embodiment of the disclosure, one same SMF for all PDU sessions supporting the same S-NSSAI may be selected, and the SMF may manage the slice-AMBR, the first session-AMBR, and the second session-AMBR.

The SMF 200 according to an embodiment of the disclosure may determine the first session-AMBR and the second session-AMBR in consideration of the slice-AMBR, GBR QoS flows for the first PDU session, the first session-AMBR for the first PDU session, GBR QoS flows for the second PDU Session, and the second session-AMBR for the second PDU session. For example, SMF1 200 may determine to use the remaining values except for the data rate of GBR QoS flows for the first PDU session and the data rate of GBG QoS flows for the second PDU session among the slice-AMBRs for the first session-AMBR and the second session-AMBR. The first session-AMBR and the second session-AMBR determined by SMF1 200 may be the same as or different from each other. For example, when determining the first session-AMBR and the second session-AMBR, SMF1 200 may determine the first session-AMBR and the second session-AMBR in consideration of a subscribed session-AMBR for the first PDU session acquired from the UDM 104 and a subscribed session-AMBR for the second PDU session or a ratio therebetween.

SMF1 200 may transmit the first session-AMBR to the RAN 101 and UPF1 202 supporting the first PDU session through the procedure illustrated in FIG. 2. Further, SMF1 200 may transmit the slice-AMBR for the first PDU session to the RAN 101 and UPF1 202 supporting the first PDU session.

The RAN 101 and UPF1 202 may control a data rate of non-GBR QoS flows of the first PDU session on the basis of at least one of the first session-AMBR and the slice-AMBR.

SMF1 200 may transmit the second session-AMBR to the RAN 101 and the UPF (UPF1 202 when the first PDU session and the second PDU session are supported by the same UPF and UFP2 400 when the first PDU session and the second PDU session are supported by different UPFs) supporting the second PDU session through the procedure illustrated in FIG. 3B. Further, SMF1 200 may transmit the slice-AMBR for the second PDU session to the RAN 101 and the UPF 202 or 400 supporting the second PDU session.

The RAN 101 and the UPF 202 or 400 may control a data rate of non-GBR QoS flows of the second PDU session on the basis of at least one of the second session-AMBR and the slice-AMBR.

Further, SMF1 200 according to an embodiment of the disclosure may control/change the first session-AMBR and the second session-AMBR on the basis of first PDU Session status information and second PDU session status information. For example, when the status of the second PDU session is changed after the first PDU session and the second PDU session are established through the procedure illustrated in FIGS. 2 and 3A and the changed status information indicates that the second PDU session is not currently used (for example, the status of the first PDU session is changed from the activated state to the deactivated state), SMF1 200 may determine that the data rate used as the session-AMBR of the second PDU session is not currently used and change the data rate used as the session-AMBR of the second PDU session to be used as the session-AMBR of the PDU session currently in the activated state (for example, the first PDU session).

SMF1 200 may transmit the changed first session-AMBR to the RAN 101 and UPF1 202 supporting the first PDU session through the procedure illustrated in FIG. 3B. Further, SMF1 200 may transmit the slice-AMBR for the first PDU session to the RAN 101 and UPF1 202 supporting the first PDU session.

The RAN 101 and UPF1 202 may control a data rate of non-GBR QoS flows of the first PDU session on the basis of at least one of the changed first session-AMBR and the slice-AMBR.

SMF1 200 may transmit the changed second session-AMBR to the RAN 101 and the UPF (UPF1 202 when the first PDU session and the second PDU session are supported by the same UPF and UFP2 400 when the first PDU session and the second PDU session are supported by different UPFs) supporting the second PDU session through the procedure illustrated in FIG. 4A (PDU session modification procedure). Further, the SMF 200 may transmit the slice-AMBR for the second PDU session to the RAN 101 and the UPF 202 or 400 supporting the second PDU session.

The RAN 101 and the UPF 202 or 400 may control a data rate of non-GBR QoS flows of the second PDU session on the basis of at least one of the changed second session-AMBR and the slice-AMBR.

According to an embodiment of the disclosure, one same PCF 103 for all PDU sessions supporting the same S-NSSAI may be selected, and the PCF 103 may manage the slice-AMBR, the first session-AMBR, and the second session-AMBR.

In order to select the same PCF 103, the AMF 102 may select the same SMF1 200 through the method illustrated in FIG. 3A.

Alternatively, in order to select the same PCF 103, the AMF 102 may provide PCF information to SMF1 200. For example, after operation 218 to operation 220 of FIG. 2 (for example, in operation 228), SMF1 200 may transmit information on the selected PCF 103 to the AMF 102 for the first PDU session. The AMF 102 may store S-NSSAI information associated with the first PDU session and the information on the PCF 103. Thereafter, the second PDU session may be established according to the procedure illustrated in FIG. 5A. The AMF 102 may identify (determine or decide) that the S-NSSAI of the second PDU session is the same as the S-NSSAI of the first PDU session which the UE 100 has established. Accordingly, the AMF 102 may provide PCF information of the first PDU session to serving SMF2 500 of the second PDU session in operation 514. The PCF information may be information on the PCF 103 associated with the first PDU session which the AMF 102 stores in the procedure of FIG. 2. The SMF 500 receiving the PCF information from the AMF 102 may select the PCF 103 which is the same as the PCF for the first PDU session as the PCF for the second PDU Session on the basis of the PCF information received from the AMF 102 and transmit the message in operation 520 to the selected PCF 103.

The SMF 103 according to an embodiment of the disclosure may determine the first session-AMBR and the second session-AMBR in consideration of the slice-AMBR, GBR QoS flows for the first PDU session, the first session-AMBR for the first PDU session, GBR QoS flows for the second PDU Session, and the second session-AMBR for the second PDU session. SMF1 200 may transmit at least one of the first session-AMBR and the slice-AMBR for the first PDU session to the PCF 103 in operation 220 of FIG. 2. The SMF 200 or 500 may transmit at least one of the second session-AMBR and the slice-AMBR for the second PDU session to the PCF 103 in operation 320 of FIG. 3A or operation 520 of FIG. 5A.

The PCF 103 may determine to use the remaining values except for the data rate of GBR QoS flows for the first PDU session and the data rate of GBG QoS flows for the second PDU session among the slice-AMBRs for the first session-AMBR and the second session-AMBR on the basis of the information received from the SMF 200 or 500. The first session-AMBR and the second session-AMBR determined by the PCF 103 may be the same as or different from each other. For example, when determining the first session-AMBR and the second session-AMBR, the PCF 103 may determine the first session-AMBR and the second session-AMBR in consideration of a subscribed session-AMBR for the first PDU session acquired from the SMF 200 or 500 and a subscribed session-AMBR for the second PDU session and/or a ratio therebetween.

The PCF 103 may transmit at least one of the first session-AMBR and the slice-AMBR for the first PDU session determined by the PCF 103 to the SMF 200 in operation 222 of FIG. 2. Further, the PCF 103 may transmit at least one of the second session-AMBR and the slice-AMBR for the second PDU session determined by the PCF 103 to the SMF 200 or 500 in operation 322 of FIG. 3A or operation 522 of FIG. 5A.

SMF1 200 may transmit the first session-AMBR received from the PCF 103 to the RAN 101 and UPF1 202 supporting the first PDU session through the procedure illustrated in FIG. 2. Further, SMF1 200 may transmit the slice-AMBR for the first PDU session to the RAN 101 and UPF1 202 supporting the first PDU session.

The RAN 101 and UPF1 202 may control a data rate of non-GBR QoS flows of the first PDU session on the basis of at least one of the first session-AMBR and the slice-AMBR.

The SMF 200 or 500 may transmit the second session-AMBR received from the PCF 103 to the RAN 101 and the UPF (UPF1 202 when the first PDU session and the second PDU session are supported by the same UPF and UFP2 400 when the first PDU session and the second PDU session are supported by different UPFs) supporting the second PDU session through the procedure illustrated in FIG. 3B to FIG. 5A. Further, the SMF 200 or 500 may transmit the slice-AMBR for the second PDU session to the RAN 101 and the UPF 202 or 400 supporting the second PDU session.

The RAN 101 and the UPF 202 or 400 may control a data rate of non-GBR QoS flows of the second PDU session on the basis of at least one of the second session-AMBR and the slice-AMBR.

Further, the PCF 103 according to an embodiment of the disclosure may control/change the first session-AMBR and the second session-AMBR on the basis of first PDU session status information and second PDU session status information. To this end, the PCF 103 may make a request for the first PDU session status information and the second PDU session status information to the SMF 200 or 500 and acquire the first PDU session status information and the second PDU session status information from the SMF 200 or 500. For example, the PCF 103 may make a request for event subscription to the first PDU session status in operation 222 of FIG. 2 in order to receive changed information when the first PDU session status information is changed. SMF1 200 may store the event subscription request from the PCF 103 and inform the PCF 103 of the change when the first PDU session-related status is changed. Further, the PCF 103 may make a request for event subscription to the second PDU session status in operation 322 of FIG. 3A or operation 522 of FIG. 5A in order to receive changed information when the second PDU Session status information is changed. The SMF 200 or 500 may store the event subscription request from the PCF 103 and inform the PCF 103 of the change when the second PDU session-related status is changed.

For example, when the status of the second PDU session is changed after the first PDU session and the second PDU session are established through the procedure illustrated in FIGS. 3A to 5A and the changed status information means that the second PDU session is not currently used (for example, the status of the first PDU session is changed from the activated state to the deactivated state), the SMF 200 or 500 may inform the PCF 103 of the second PDU session status information. The PCF 103 may determine that the data rate used as the session-AMBR of the second PDU session is not currently used on the basis of the information received from the SMF 200 or 500 and change the data rate used as the session-AMBR of the second PDU Session to be used as the session-AMBR of the PDU session currently in the activated state (for example, the first PDU session). Accordingly, the PCF 103 may inform SMF1 200 of the changed first session-AMBR. Further, the PCF 103 may inform the SMF 200 or 500 of the changed second session-AMBR.

SMF1 200 may transmit the changed first session-AMBR to the RAN 101 and UPF1 202 supporting the first PDU session through the procedure illustrated in FIG. 3B (PDU session modification procedure). Further, SMF1 200 may transmit the slice-AMBR for the first PDU session to the RAN 101 and UPF1 202 supporting the first PDU session.

The RAN 101 and UPF1 202 may control a data rate of non-GBR QoS flows of the first PDU session on the basis of at least one of the first session-AMBR and the slice-AMBR.

The SMF 200 or 500 may transmit the changed second session-AMBR to the RAN 101 and the UPF (UPF1 202 when the first PDU session and the second PDU session are supported by the same UPF and UFP2 400 when the first PDU session and the second PDU session are supported by different UPFs) supporting the second PDU session through the PDU session modification procedure. Further, the SMF 200 or 500 may transmit the slice-AMBR for the second PDU session to the RAN 101 and the UPF 202 or 400 supporting the second PDU session.

The RAN 101 and the UPF 202 or 400 may control the data rate of non-GBR QoS flows of the second PDU session on the basis of at least one of the changed second session-AMBR and the slice-AMBR.

Subsequently, another embodiment according to the disclosure is described.

Embodiments of the disclosure may be applied to a roaming situation. According to an embodiment, the slice-AMBR may be applied to data rates of a home-routed roaming session and a local breakout roaming session on the basis of a service provider policy. In this case, the slice-AMBR applied to the data rates of the home-routed roaming session and the local breakout roaming session may be determined on the basis of a home public land mobile network (HPLMN) policy or a visited public land mobile network (VPLMN) policy. Further, the slice-AMBR may be determined on the basis of agreement between the HPLMN and the VPLMN (for example, service level agreement (SLA) between the HPLMN and the VPLMN or interaction between an NF of the HPLMN and an NF of the VPLMN (for example, interaction between an hPCF and a vPCF, or a value determined by a vSMF or the vPCF on the basis of a value received from an hUDM)). In the above description, "h" is abbreviation of home and "v" is abbreviation of visited. That is, the hPCF may be the PCF located in the home network and the vPCF may be the PCF located in the visited network.

According to another embodiment, the slice-AMBRs may be divided into a value applied to the data rate of the home-routed roaming session and a value applied to the data rate of the local breakout roaming session on the basis of the service provider policy. In this case, the slice-AMBR applied to the data rate of the home-routed roaming session may be determined on the basis of the HPLMN policy. The slice-AMBR applied to the data rate of the local breakout roaming session may be determined on the basis of the VPLMN policy. Further, the slice-AMBR may be determined on the basis of agreement between the HPLMN and the VPLMN (for example, SLA between the HPLMN and the VPLMN or interaction between the NF of the HPLMN and the NF of the VPLMN (for example, interaction between the hPCF and the vPCF, or a value determined by the vSMF or the vPCF on the basis of a value received from the hUDM)).

According to another embodiment, there may be a first slice-AMBR applied to the data rate of the home-routed roaming session and a second slice-AMBR applied to the data rate of the local breakout roaming session on the basis of the service provider policy. In this case, the first slice-AMBR applied to the data rate of the home-routed roaming session may be determined on the basis of the HPLMN policy. The second slice-AMBR applied to the data rate of the local breakout roaming session may be determined on the basis of the VPLMN policy. Further, the slice-AMBR may be determined on the basis of agreement between the HPLMN and the VPLMN (for example, SLA between the HPLMN and the VPLMN or interaction between the NF of the HPLMN and the NF of the VPLMN (for example, interaction between the hPCF and the vPCF, or a value determined by the vSMF or the vPCF on the basis of a value received from the hUDM)).

Referring to FIG. 10, the AMF 102 receiving a PDU session establishment request message from the UE 100 in operation 1001 may determine whether the session requested by the UE 100 corresponds to home-routed roaming or local breakout roaming. The AMF 102 may select an SMF on the basis of the determination and/or a service provider policy.

According to an embodiment, when the slice-AMBR is applied to the data rates of the home-routed roaming session and the local breakout roaming session, the AMF 102 may select the SMF (and/or the PCF) such that the SMF (and/or the PCF) of the home-routed roaming session is the same as the SMF (and/or the PCF) of the local breakout roaming session in operation 1002.

According to another embodiment, when slice-AMBRs applied to the data rate of the home-routed roaming session and the data rate of the local breakout roaming session are separated, the AMF 102 may select SMFs such that the SMF (and/or the PCF) of the home-routed roaming session is different from the SMF (and/or the PCF) of the local breakout roaming session in operation 1002 unlike in FIG. 10.

When the AMF 102 select SMF1 200 on the basis of one of the above methods, the AMF 102 may transmit a PDU session create request message to SMF1 200 in order to generate a PDU Session in operation 1003.

SMF1 200 receiving the PDU session create request message from the AMF 102 in operation 1003 may determine the session-AMBR of the roaming session requested by the UE in consideration of the slice-AMBR (not shown). Alternatively, the PCF 103 establishing policy association with SMF1 200 may determine the session-AMBR of the roaming session requested by the UE in consideration of the slice-AMBR (not shown). SMF1 200 described below may be the SMF of the HPLMN or the SMF of the VPLMN. The PCF described below may be the PCF of the HPLMN or the PCF of the VPLMN.

According to an embodiment, when the session requested by the UE 100 is the home-routed roaming session and the slice-AMBR applied to the data rate of the home-routed roaming session is determined on the basis of the HPLMN policy, the SMF (and/or the PCF) may determine the session-AMBR on the basis of at least one of the subscribed slice-AMBR, the serving network slice-AMBR, and the authorized slice-AMBR received from the NF of the HPLMN (for example, the UDM, the PCF, or the SMF).

According to an embodiment, when the session requested by the UE 100 is the home-routed roaming session and the slice-AMBR applied to the data rate of the home-routed roaming session is determined on the basis of the VPLMN policy, the SMF (and/or the PCF) may determine the session-AMBR on the basis of at least one of the subscribed slice-AMBR, the serving network slice-AMBR, and the authorized slice-AMBR received from the NF of the HPLMN (for example, the UDM, the PCF, or the SMF) and/or the NF of the VPLMN (for example, the PCF).

According to an embodiment, when the session requested by the UE 100 is the local breakout roaming session and the slice-AMBR applied to the data rate of the local breakout roaming session is determined on the basis of the HPLMN policy, the SMF (and/or the PCF) may determine the session-AMBR on the basis of at least one of the subscribed slice-AMBR, the serving network slice-AMBR, and the authorized slice-AMBR received from the NF of the HPLMN (for example, the UDM, the PCF, or the SMF).

According to an embodiment, when the session requested by the UE 100 is the local breakout roaming session and the slice-AMBR applied to the data rate of the local breakout roaming session is determined on the basis of the VPLMN policy, the SMF (and/or the PCF) may determine the session-AMBR on the basis of at least one of the subscribed slice-AMBR, the serving network slice-AMBR, and the authorized slice-AMBR received from the NF of the HPLMN (for example, the UDM, the PCF, or the SMF) and/or the NF of the VPLMN (for example, the PCF).

The embodiments of the disclosure described above may be applied to an EPC interworking situation.

Figure 11:
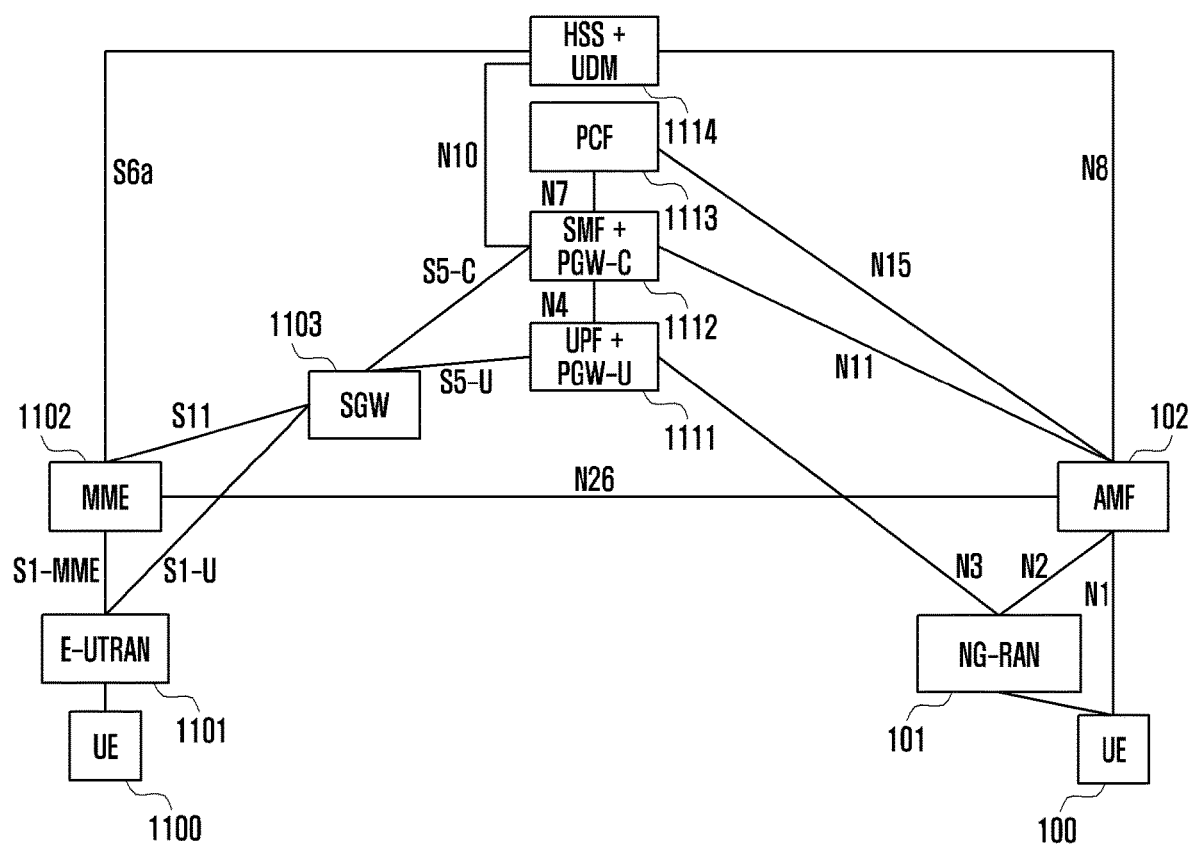
FIG. 11 illustrates a 5GS/EPS interworking structure according to various embodiments of the disclosure.

FIG. 11 illustrates an interworking structure of a 5GS system and an EPS system.

In FIG. 11, the UE 100, the RAN 101, and the AMF 102 may be elements of the same 5G network described above. Further, a second UE 1100 of a mobile communication network such as 3G and/or 4G may be connected to an SGW 1103 and an MME 1102 via an E-TURAN 1101. The SBW 1103 may transmit data/information/signals to network entities capable of performing the operation which is the same as or similar to that described in the disclosure.

In FIG. 11, an element for the interworking between the 3G and/or 4G mobile communication network and a 5G mobile communication network is additionally included. Specifically, in FIG. 11, UFP+GPW-U 1111 and E-UTRAN 1101 may perform data processing of user plane described above and perform data processing in units of network slices. Accordingly, when a data service is provided to a specific UE through one or more network slices, data transmission may be performed on the basis of at least one of a subscribed slice-AMBR, a serving network slice-AMBR, and an authorized slice-AMBR.

Further, in FIG. 11, SMF+PGW-C 1112 may be a network entity capable of providing the SMF function according to an embodiment of the disclosure described above. The PCF 1113 of FIG. 11 may provide the PCF function according to an embodiment of the disclosure described above. HSS+UDM 1114 of FIG. 11 may provide the UDM function according to an embodiment of the disclosure described above. The SMF+PGW-C 1112 may receive UE subscription information of the specific UE 100 or 1100 from the HSS+UDM 1114. The UE subscription information may include the slice-AMBR. The SMF+PGW-C 1112 and/or the PCF 1113 may determine the data rate of a PDN connection requested by the UE in consideration of the slice-AMBR. When the SMF+PGW-C 1112 determines the data rate, the SMF+PGW-C 1112 may determine the data rate through interaction with the PCF 1113. The SMF+PGW-C 1112 may transmit the data rate determined by the SMF+PGW-C 1112 or the data rate received from the PCF 1113 to the UPF PGW-U 1111. Further, the SMF+PGW-C 1112 may transmit the data rate determined by the SMF+PGW-C 1112 or the data rate received from the PCF 1113 to the E-UTRAN 1101 via the SGW 1103 and the MME 1102.

Figure 8:
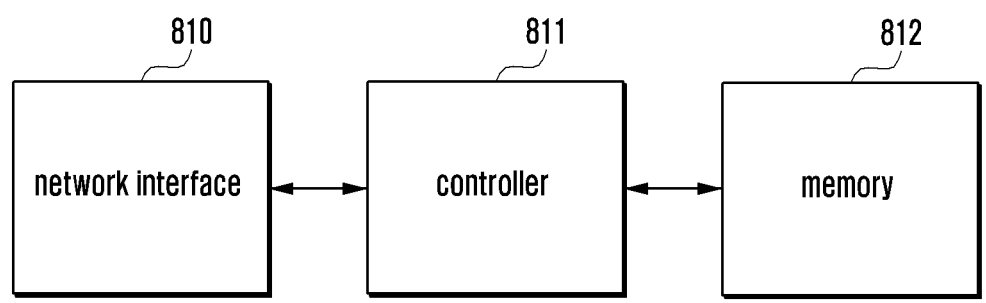
FIG. 8 is a block diagram illustrating internal functions of NFs according to various embodiments of the disclosure.

FIG. 8 is a block diagram illustrating internal functions of NFs according to various embodiments of the disclosure.

Prior to the description of FIG. 8, the NF may be one of the AMF 102, the PCF 103, the UDM 104, SMF1 200, SMF2 500, UPF1 202, and UPF2 400 described in the disclosure. Further, the NF may be one of the SGW 1103, the UPF+PFW-U 1111, the SMF+PGW-C 1112, the PCF 1113, and the HSS+UDM 1114 interworking with the 3G mobile communication network and/or the 4G mobile communication network.

Referring to FIG. 8, a network interface 810 may communicate with another network entity in the core network. For example, when the NF is the AMF 102, the NF may communicate with SMF1 200, SMF2 500, and the PCF 103. In another example, when the NF is the PCF 103, the NF may communicate with the AMF 102, the UDM 104, and SMF1 200. In a similar or same way, when the NF is one specific network entity, the network interface 810 may communicate with another entity in the core network. In another example, when the NF is SMF+PGW-C 1112, the NF may communicate with one network entity among the UPF+PFW-U 1111, the PCF 1113, and HSS+UDM 1114. The network interface may be implemented in specific circuit/logic hardware.

A controller 811 may be implemented as at least one processor or/and program for performing the operation of the NF. For example, when the NF is the AMF 102, the controller 811 may perform the operation of the AMF 102. In another example, when the NF is the PCF 103, the operation of the PCF 103 may be performed. In another example, when the NF is the SMF+PGW-C 1112, the control operation corresponding to the SMF+PGW-C 1112 may be performed. In the case of other network entities, the control required for the operation may be equally performed.

A memory 812 may store programs required for the controller 811 and various pieces of control information, and also store information described in the disclosure. The memory 812 may be implemented in various forms and configured in any form having a format such as a semiconductor memory, a buffer, a hard disk, a RAM, or a ROM. Further, data which can be stored in the memory 812 may store information received by the AMF 102 or information received from an external entity when the NF is the AMF 102. In another example, when the NF is the PCF 103, control information required for the PCF 103 or/and received information may be stored. In another example, when the NF is the UDM 104, various pieces of information such as information related to a user device and information for the control by the UDM may be stored. In another example, when the NF is SMF1 200, the above describe data and data for the control may be stored. Other network entities may also store information required for the operation described above.

In addition to the above-described elements, the NF may further include various interfaces for access to an operator. In the disclosure, there is no special limitation on such additional elements.

Figure 9:
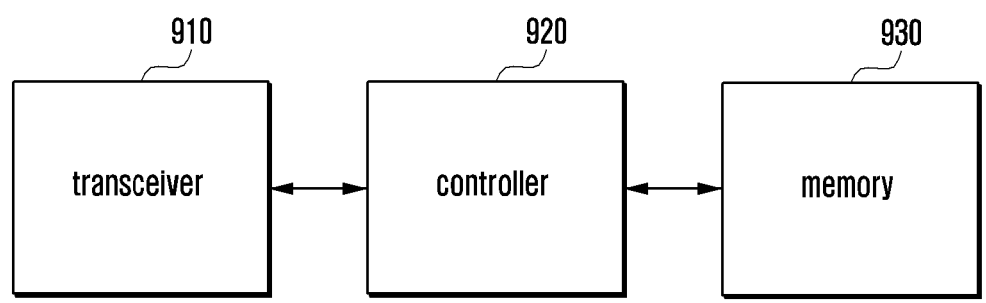
FIG. 9 is a block diagram illustrating interval functions of the UE according to various embodiments of the disclosure.

FIG. 9 is a block diagram illustrating interval functions of the UE according to various embodiments of the disclosure.

Referring to FIG. 9, the UE 100 may include a transceiver 910, a controller 920, and a memory 930. The UE 100 may additionally have more elements according to an implementation scheme. For example, various additional devices such as a display, an input unit, a sensor, and the like for a user interface may be further included. The disclosure does not limit such additional elements.

The transceiver 910 may be connected to the RAN 101 through a radio channel on the basis of the embodiments described with reference to FIGS. 1 to 7 and may transmit and receive signals and/or message to and from the RAN 101. When the UE 100 communicates with the 5G network, the transceiver 910 may be a device capable of performing transmission/reception with the 5G communication network. Further, the transceiver 910 may include a communication processor as necessary. When the transceiver 910 does not include the communication processor, all signals and/or messages may be processed by a controller.

The controller 920 may control the basic operation of the UE 100 and control reception and storage of the above-described messages. Further, the controller 920 may control transmission or reception of data through a specific network slice. The controller 920 may be configured by at least one processor.

The memory 930 may store various pieces of data required for controlling the UE 100, and may have an area to store messages received from the RAN 101 and/or a specific NF of the core network in order to perform communication through the above-describe network slice. The memory 930 may be implemented in various forms and configured in any form having a format such as a semiconductor memory, a buffer, a hard disk, a RAM, or a ROM.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

INDUSTRIAL APPLICABILITY

The disclosure can be used to control a data rate of a UE when a wireless communication system has a network slice structure.

The invention claimed is:

1. A method performed by a session management function (SMF) entity in a wireless communication system, the method comprising:
receiving, from an access and mobility management function (AMF) entity, a protocol data unit (PDU) session create request message including at least one of a PDU session ID, single network slice selection assistance information (S-NSSAI) and a data network name (DNN);
transmitting, to the AMF entity, a PDU session create response message based on the PDU session create request message; and
transmitting, to the AMF entity, a first message including session management information, the session management information including a per slice maximum bit rate (MBR) corresponding to the received S-NSSAI.

2. The method of claim 1,
wherein the per slice MBR is applied for at least one PDU session of a terminal corresponding to the S-NSSAI, and
wherein bit rates across all guaranteed bit rate (GBR) and non-GBR quality of service (QOS) flows included in the at least one PDU session are not exceeding the per slice MBR.

3. A method performed by an access and mobility management function (AMF) entity in a wireless communication system, the method comprising:
receiving, from a base station, a registration request message for a registration of a terminal;
acquiring, from a user data management (UDM) entity, subscription information for the terminal, the subscription information including at least one subscribed per slice maximum bit rate (MBR);
transmitting, to a policy control function (PCF) entity, a policy control create message including the at least one subscribed per slice MBR; and
receiving, from the PCF entity, a policy control create response message including at least one per slice MBR for a network slice of the terminal.

4. The method of claim 3, the method further comprising:
transmitting, to a session management function (SMF) entity, a protocol data unit (PDU) session create request message including at least one of a PDU session ID, a single network slice selection assistance information (S-NSSAI) and a data network name (DNN);
receiving, from the SMF entity, a PDU session create response message based on the PDU session create request message;
receiving, from the SMF entity, a second message including session management information; and
transmitting, to a base station, a N2 PDU session request message including the session management information,
wherein the session management information includes a per slice maximum bit rate (MBR) corresponding to the transmitted S-NNSAI.

5. The method of claim 4,
wherein the per slice MBR is applied for at least one protocol data unit (PDU) session of the terminal corresponding to the S-NSSAI, and
wherein bit rates across all guaranteed bit rate (GBR) and non-GBR quality of service (QOS) flows included in the at least one PDU session are not exceeding the per slice MBR.

6. A method performed by a base station, in a wireless communication system, the method comprising:
transmitting, to a access and mobility (AMF) entity, a registration request message for a terminal; and
based on a transmission of the registration request message, receiving, from the AMF, a N2 PDU session request message including session management information,
wherein the session management information includes a per slice maximum bit rate (MBR).

7. The method of claim 6, wherein the per slice MBR is applied for at least one protocol data unit (PDU) session of the terminal corresponding to an single network slice selection assistance information (S-NSSAI).

8. The method of claim 7, wherein bit rates across all guaranteed bit rate (GBR) and non-GBR quality of service (QOS) flows included in the at least one PDU session are not exceeding the per slice MBR.

9. A session management function (SMF) entity in a wireless communication system, the SMF entity comprising:
a transceiver; and
at least one processor configured to:
receive, from an access and mobility management function (AMF) entity, a protocol data unit (PDU) session create request message including at least one of a PDU session ID, single network slice selection assistance information (S-NSSAI) and a data network name (DNN),
transmit, to the AMF entity, a PDU session create response message based on the PDU session create request message, and
transmit, to the AMF entity, a first message including session management information, session management information including a maximum bit rate, per slice MBR, corresponding to the received S-NSSAI.

10. The SMF entity of claim 9,
wherein the per slice MBR is applied for at least one PDU session of a terminal corresponding to the S-NSSAI, and
wherein bit rates across all guaranteed bit rate (GBR) and non-GBR quality of service (QOS) flows included in the at least one PDU session are not exceeding the per slice MBR.

11. An access and mobility management function (AMF) entity in a wireless communication system, the AMF entity comprising:
a transceiver; and
at least one processor configured to:
receive, from a base station, a registration request message for a registration of a terminal,
acquire, from a user data management (UDM) entity, subscription information for the terminal, the subscription information including at least one subscribed per slice maximum bit rate (MBR),
transmit, to a policy control function (PCF) entity, a policy control create message including the at least one subscribed per slice MBR, and
receive, from the PCF entity, a policy control create response message including at least one per slice MBR for a network slice of the terminal.

12. The AMF entity of claim 11, wherein the at least one processor is further configured to:
transmit, to a session management function (SMF) entity, a protocol data unit (PDU) session create request message including at least one of a PDU session ID, a single network slice selection assistance information (S-NSSAI) and a data network name (DNN),
receive, from the SMF entity, a PDU session create response message based on the PDU session create request message,
receive from the SMF entity, a second message including session management information, and
transmit, to a base station, a N2 PDU session request message including the session management information,
wherein the session management information includes a per slice maximum bit rate (MBR) corresponding to the transmitted S-NSSAI.

13. The AMF entity of claim 12,
wherein the per slice MBR is applied for at least one protocol data unit (PDU) session of the terminal corresponding to the S-NSSAI, and
wherein bit rates across all guaranteed bit rate (GBR) and non-GBR quality of service (QOS) flows included in the at least one PDU session are not exceeding the per slice MBR.

14. A base station, in a wireless communication system, the base station comprising:
a transceiver; and
at least one processor configured to:
transmit, to a access and mobility (AMF) entity, a registration request message for a terminal, and
based on a transmission of the registration request message, receive, from the AMF, a N2 PDU session request message including session management information,
wherein the session management information includes a maximum bit rate (MBR).

15. The base station of claim 14,
wherein a per slice MBR is applied for at least one protocol data unit (PDU) session of the terminal corresponding to single network slice selection assistance information (S-NSSAI), and
wherein bit rates across all guaranteed bit rate (GBR) and non-GBR quality of service (QOS) flows included in the at least one PDU session are not exceeding the per slice MBR.

* * * * *